COLOR TELEVISION SYSTEM WITH CODING

Filed Aug. 7, 1958

INVENTOR
GEORGES VALENSI
BY [signature]
AGENT

COLOR TELEVISION SYSTEM WITH CODING

INVENTOR
GEORGES VALENSI
BY [signature]
AGENT

INVENTOR
GEORGES VALENSI
BY [signature]
AGENT

COLOR TELEVISION SYSTEM WITH CODING

Filed Aug. 7, 1958 11 Sheets-Sheet 4

INVENTOR
GEORGES VALENSI
BY [signature] AGENT

COLOR TELEVISION SYSTEM WITH CODING

INVENTOR
GEORGES VALENSI
By [signature]
AGENT

COLOR TELEVISION SYSTEM WITH CODING

Filed Aug. 7, 1958 11 Sheets-Sheet 6

INVENTOR
GEORGES VALENSI
BY [signature]
AGENT

INVENTOR
GEORGES VALENSI
BY [signature]
AGENT

INVENTOR
GEORGES VALENSI
BY [illegible]
AGENT

COLOR TELEVISION SYSTEM WITH CODING

Filed Aug. 7, 1958 11 Sheets-Sheet 9

INVENTOR
GEORGES VALENSI
BY [signature]
AGENT

INVENTOR
GEORGES VALENSI
BY [signature]
AGENT

INVENTOR
GEORGES VALENSI
By [signature]
AGENT 2,982,811
Patented May 2, 1961

2,982,811

COLOR TELEVISION SYSTEM WITH CODING

Georges Valensi, 3 Rue Chaudronniers, Geneva, Switzerland

Filed Aug. 7, 1958, Ser. No. 753,693
Claims priority, application France Aug. 12, 1957
6 Claims. (Cl. 178—5.2)

The present invention concerns the color television system represented schematically on Figure 1 and described in U.S. Patent No. 2,920,131, entitled "Color Television Systems With Coding." This system is based on the mapping of Maxwell's color triangle in sectors, as shown on the appended Figure 1–*c*, B, V, R representing the primary colors (blue, green and red) produced through, dichroic mirrors D, D′ within the three cameras ΓB, ΓV, ΓR at the transmitting station (Figure 1), and also the colors of luminescence of the small phosphor elements building the trichrome fluorescent screen *Fl* of the three electron guns viewing tube TR at the receiving station.

Referring to Figure 1, the 3 pictures of the televised object obtained through objective O*b* and dichroic mirrors D, D′ produce, at the output of cameras (ΓB, ΓV, ΓR), 3 primary signals ($E_B$, $E_V$, $E_R$), that matrix of resistors M transforms in 3 secondary signals respectively proportional to the components X, Y (and to the sum $X+Y+Z$ of the 3 components) of the luminous flux emitted by the scanned point of the televised object in the XYZ colorimetric reference system of the International Illumination Committee, said signal Y being precisely the luminance signal *l* characterizing the brightness of said point. $Lg_1$, $Lg_2$, $Lg_3$ are 3 logarithmic formatrons, which, associated with two electronic substracters ($Sou_1$, $Sou_2$), derive, from said secondary signals X, Y, $(X+Y+Z)$, two tertiary signals ($\log^x$, $\log^y$) proportional to the logarithms of the trichromatic coordinates *x*, *y* of the sector of the color triangle (Figure 1–*c*) corresponding to the color of the elemental area comprising said scanned point. TC is an encoding cathode ray tube comprising a cathode, an anode made of metallic sectors ($a_1 \ldots a_n$) corresponding, in logarithmic transform, to the sectors of the color triangle (Figure 1–*c*), and two pairs of plates (P*x*, P*y*) for horizontally and vertically positioning the electronic image of said cathode on the particular anode sector corresponding to the color of said elemental area, under the control of said tertiary signals ($\log^x$, $\log^y$), whereby a chrominance signal *Chr* is obtained at the output of tube TC. O*s* is the oscillator generating the color subcarrier of frequency $f_2$ (odd multiple of half the scanning lines frequency), and M*c* is a modulator which modulates in amplitude said color subcarrier by means of said chrominance signal *Chr*. M*sr* is a modulator which modulates said color subcarrier in amplitude by means of a local battery *p*′, the output of M*sr* reaching the final electronic mixer MF, through electronic gate $\gamma$ controlled by the line synchronizing pulses $t_l$ generated by the central synchronizing device DS. Said device DS generates also the field synchronizing signals $t_i$, as well as the saw-tooth waves for scanning simultaneously the photosensitive mosaics of cameras ΓB, ΓV, ΓR. The luminance signal $l=Y$, the color subcarrier modulated by the chrominance signal *Chr*, the amplitude reference signal *sr* obtained at the beginning of each scanning line (at the output of gate $\gamma$) and the synchronizing pulses $t_l$ and signals $t_i$ are mixed together by electronic mixer MF in order to obtain the composite video signal V. Figure 1–*b* represents the oscillograms of one scanning line, and Figure 1–*a* the interlaced luminance and chrominance spectra.

The composite video signal V (together with *sr*, $t_l$, $t_i$) reaches, through line L (radio relay link or coaxial pair of a long distance cable), the distant receiving station represented schematically at the bottom of Figure 1. The total spectrum of the received composite video signal V occupying the band $B_1$ (Figure 1–*a*) is divided in two parts by filter $F_3$ (passing the low frequency part $B_3$, which includes the greatest part of the luminance energy and the synchronizing pulses $t_l$ and signals $t_i$), and filter $F_2$ passing the medium and high frequency parts $(B_2+B'_2)$—whereas filter $F_4$ (having a very narrow passing band) separates the major part of the color subcarrier of frequency $f_2$. SVS is the synchro-video-separator taking (out of band $B_3$) the field synchronizing signals $t_i$ and the line synchronizing pulses $t_l$ which trigger respectively the saw-tooth generator O*v* for vertical electrical scanning and the saw-tooth generator O*h* for horizontal electrical scanning of the trichrome fluorescent screen *Fl* of the viewing cathode ray tube TR. The low frequency part *l*′ (band $B_3$), of the spectrum of V contains the greatest part of the luminance energy; but the other luminance component *l*″ (bands $B_2$ and $B'_2$) are necessary for the correct reproduction of the drawing of the televised object. Part $B'_2$ (having the same width as part $B_3$) contains all the chrominance information. Therefore band $B'_2$ (at the output of filter $F'_2$) alone feeds the chrominance detector CD, at the output of which is reproduced the received chrominance signal *Chr* to be amplified by amplifier A*c*. It is necessary to correct said signal *Chr* for compensating the variations (against time) of the transmission over line L; these variations have altered in the same proportion the amplitude of the chrominance signal *Chr* and the amplitude of the amplitude reference signal *sr* (Figure 1–*b*). Therefore the output current of filter $F_4$ goes through electronic gate $\gamma$, which opens only during said signal *sr* under the control of the line synchronizing pulse $t_l$. At the output of gate $\gamma$, rectifier R provides to amplifier A*c* the necessary volume control for compensating automatically said variations of the transmission over line L, so that the amplifier chrominance signal *Chr* is restored, at the output of A*c*, with its original amplitude.

TD is the color decoding cathode ray tube comprising a rectilinear vertical cathode K emitting a flat electron beam and surrounded by a Wehnelt cylinder W for adjusting the intensity of said beam under the control of *l*′ (part $B_3$ of the luminance spectrum), an accelerating cylindrical anode A at a high positive potential referred to said cathode K, a pair of plates P for horizontally deflecting said flat beam under the control of the corrected received chrominance signal *Chr*, a decoding electrode ED represented on Figure 1–*f* and having four slits (B, V, R, S) behind which are located four collecting electrodes (*ab*, *av*, *ar*, *as*). At each instant, the electrons of the electronic image of cathode K produce, through said slits, four signals having respective intensities proportional to the components (B′, V′, R′) of the luminous (blue, green and red) fluxes to be mixed together for reproducing the hue of the color of the scanned elemental area of the televised object, and to the degree of saturation S of said color of said elemental area.

WD is a "luminance weighting device" (made of a tetrode and a triode in case of U.S. patent application Serial No. 656,970, filed May 3, 1957), energized by *l*′ (part $B_3$ of the luminance spectrum) and controlled by signal S in such a way that the output $l'_1$ of said device WD is small when S is large, and vice versa. This weighted luminance component $l'_1$ and the rest $l''$ of the luminance are applied together to the luminance matrix *Ml*, which divides the total luminance signal $(l'_1+l'')$ in three primary components corresponding to the luminous fluxes B (blue), V (green) and R (red) to be mixed together for producing white light. (Figure 3–*d* gives the constitution of said luminance matrix *Ml*.) *mr, mv, mb* are electronic mixers which mix together the components B, V, R (obtained at the output of *Ml*) with the corresponding components B′, V′, R′ (obtained at the output of tube TD). These mixtures are applied to the control electrodes of the 3 electron guns (*cb, cv, cr*) of viewing tube TR through gamma correctors (not represented on Figure 1, but the same as *Cb, Cv* and *Cr* of Figure 3).

A first object of the present invention is to adapt the color television system represented on Figure 1 to the transmission characteristics of the existing powerful radio-broadcasting transmitters. The encoding and decoding process based on the mapping of Maxwell's color triangle in a rather large number of sectors corresponding to the various chromaticities that the human eye can distinguish requires, for a satisfactory transmission of the coded color signal *Chr* (chrominance signal) between the color television transmitting and receiving stations, a link having a rather large range of linear variation of the amplitude. This is the case of a coaxial pair in long distance cables having a range of amplitude of the order of 60 decibels corresponding to a ratio of voltages of one thousand; such a line offers the possibility of having as much as 128 different sectors in the color triangle (instead of only 27 on Figure 1–*c*) corresponding to 32 different hues and 4 different degrees of saturation. In practical radio-broadcasting, powerful transmitters are used in order to cover a large ground, but their range of linear variation of the amplitude is restricted to about 30 decibels, corresponding to a ratio of voltages of only 31.6. In order to comply with these transmission characteristics of radio-transmitters for color television, instead of having a chrominance signal *Chr* representing both the hue and the saturation of the scanned colored elemental area of the televised object, two components of the chrominance signal (corresponding respectively to said hue and to said saturation) are, in accordance with the present invention, transmitted successively, one being delayed at the receiving station in order to be used simultaneously with the other.

A second object of the present invention is to adapt in the most favourable manner, the color television system represented on Figure 1 to the use of a long distance waveguide between the color television transmitting and receiving stations.

A third object of the present invention is to adapt the color television system represented in Figure 1 to the projection of colored pictures on a large screen. Up to now, for this purpose, three primary pictures (for example blue, red and green) produced by the fluorescent screens of 3 different cathode ray tubes have been superposed on said large projection screen; but this involves an optical registration problem, very difficult to solve perfectly in practice.

Viewing tubes, having a trichrome fluorescent screen made of a mosaic of point (or strips) constituted by materials producing respectively blue, green and red luminescent lights when cathode rays impinge on them, are not appropriate for the projection of large colored pictures on a large projection screen for two reasons. Firstly, because of the necessity of having, in case of high definition pictures, a great number of distinct juxtaposed points (or strips) of phosphors giving respectively the primary colors of luminescent light, the trichrome fluorescent screen has relatively large dimensions, and there is no simple optical system of great aperture capable of projecting an enlarged image of such a large luminous object. Secondly, the pattern of points (or strips) constituting said fluorescent screen would be too visible when optically enlarged, and therefore the projected images would not be satisfactory.

Moreover, in the 3 electron guns shadow mask viewing tube (TR on Figure 1) manufactured by Radio Corporation of America, the registration of the 3 electron beams through the small holes of the shadow mask requires preliminary accurate adjustments of magnet assemblies, and the presence of said shadow mask reduces the available brightness.

The beam indexing display of Philco Corporation called "Apple tube" can provide more brightness, but requires a rather intricate circuitry, necessitating also various adjustments, for fulfilling three different corrections:

(*a*) The "monochrome correction," accomplished by a synchronous detector sampling the color subcarrier to recover the red, green and blue information to be added to the luminance signal, (*b*) The "equi-angle correction," accomplished by deriving a color subcarrier with appropriate phase sequence and appropriate magnitude to be added to the original subcarrier, (*c*) The "frequency change" required because the frequency of the received color subcarrier differs from the rate at which the cathode ray spot crosses the groups of 3 strips having one of each fluorescent color, and accomplished by heterodyning the color subcarrier with a signal derived from the beam-indexing circuit. These difficulties (due to optical registration of 3 different pictures, or due to electrical circuitry adjustments, or due to the presence of a too visible and permanent pattern of colored points or strips) are avoided in the present invention.

Experience has proved that the human eye needs not as much "color information" as "drawing information"; therefore good colored pictures can be obtained, as explained hereafter, by superposing on a projection screen a high definition black and white picture (with for example 565 scanning lines) and a rather coarse colored picture of the same televised object (with for example only 200 scanning lines). In the high definition black and white picture all the "points" of the drawing of said televised object are reproduced, whereas the coarse colored picture reproduces only the colored "elemental areas" that the human eye can easily discriminate from each other on the surface of said televised object.

The invention will be better understood in referring to the appended drawings in which:

Figures 2–*c*, 3–*a*, 3–*b*, 3–*c* and 3–*d* illustrate some parts of said system.

Figure 4–*a* represents the oscillogram of one scanning line.

Figure 6:
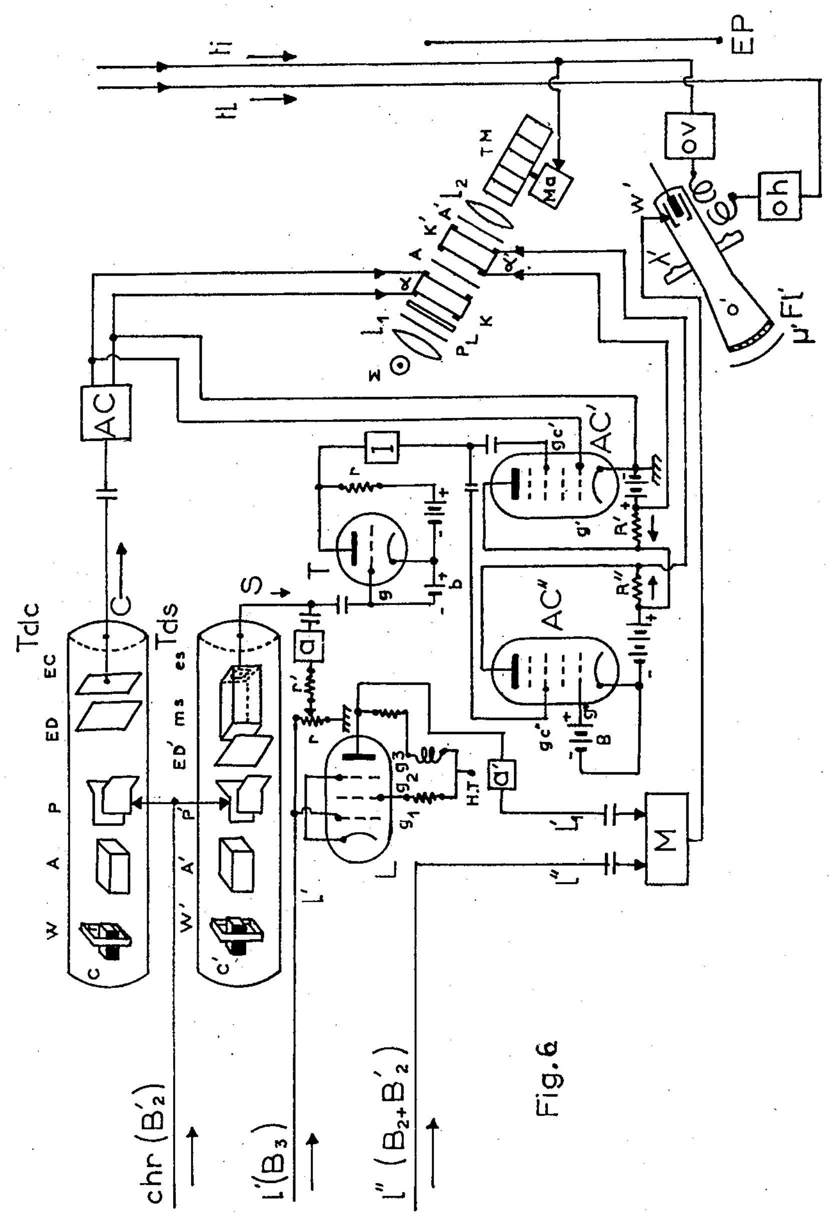
Figures 6A, 6B, 6C, 6D:
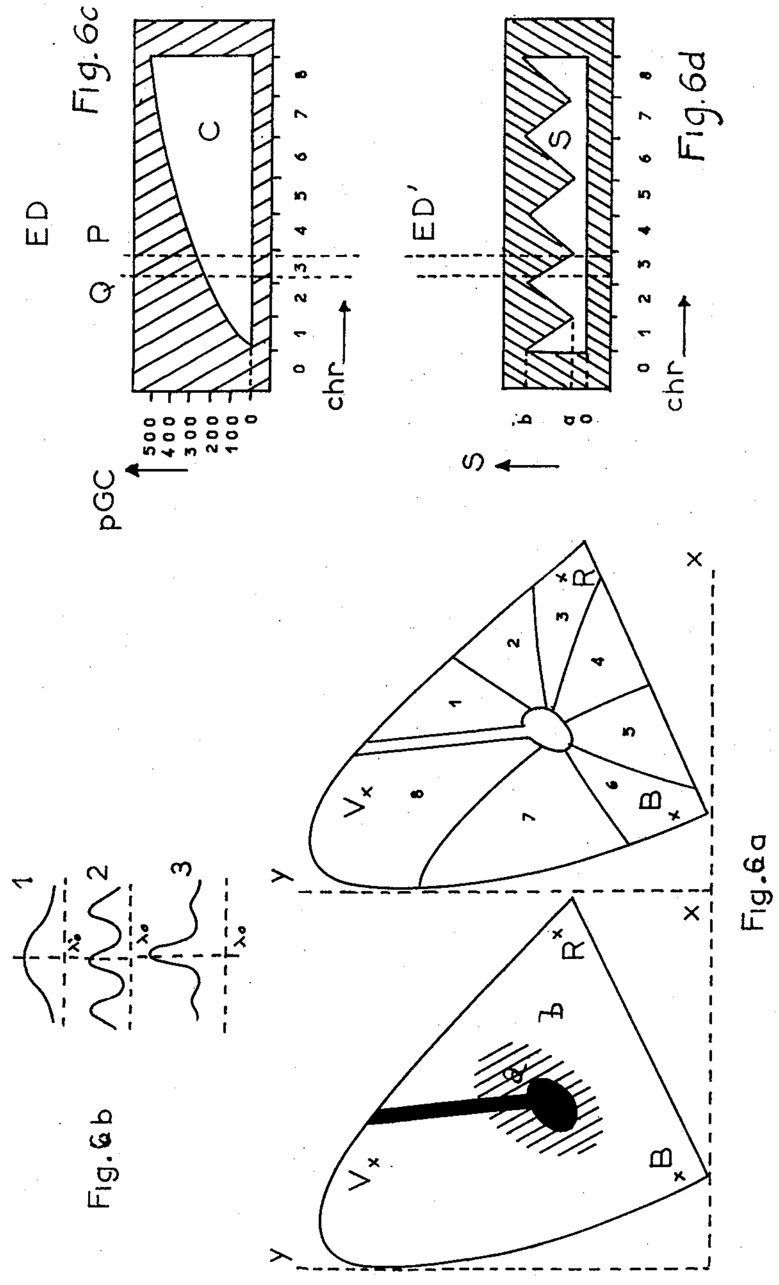

Figure 6 represents one arrangement for projecting colored pictures on a large projection screen EP, in which a cathode ray tube O′ produces a high definition black and white picture of the televised object while a coarse colored picture of said object is produced by a powerful source Σ of light modulated in color by devices KK′ based on electrical birefringence and reflected on a rotating mirror drum TM; Figure 6–*a* shows the color triangle corresponding to said arrangement; Figures 6–*b*, 6–*c*, 6–*d* concern some parts of said arrangement.

Figures 7A, 7B, 7C, 7D:
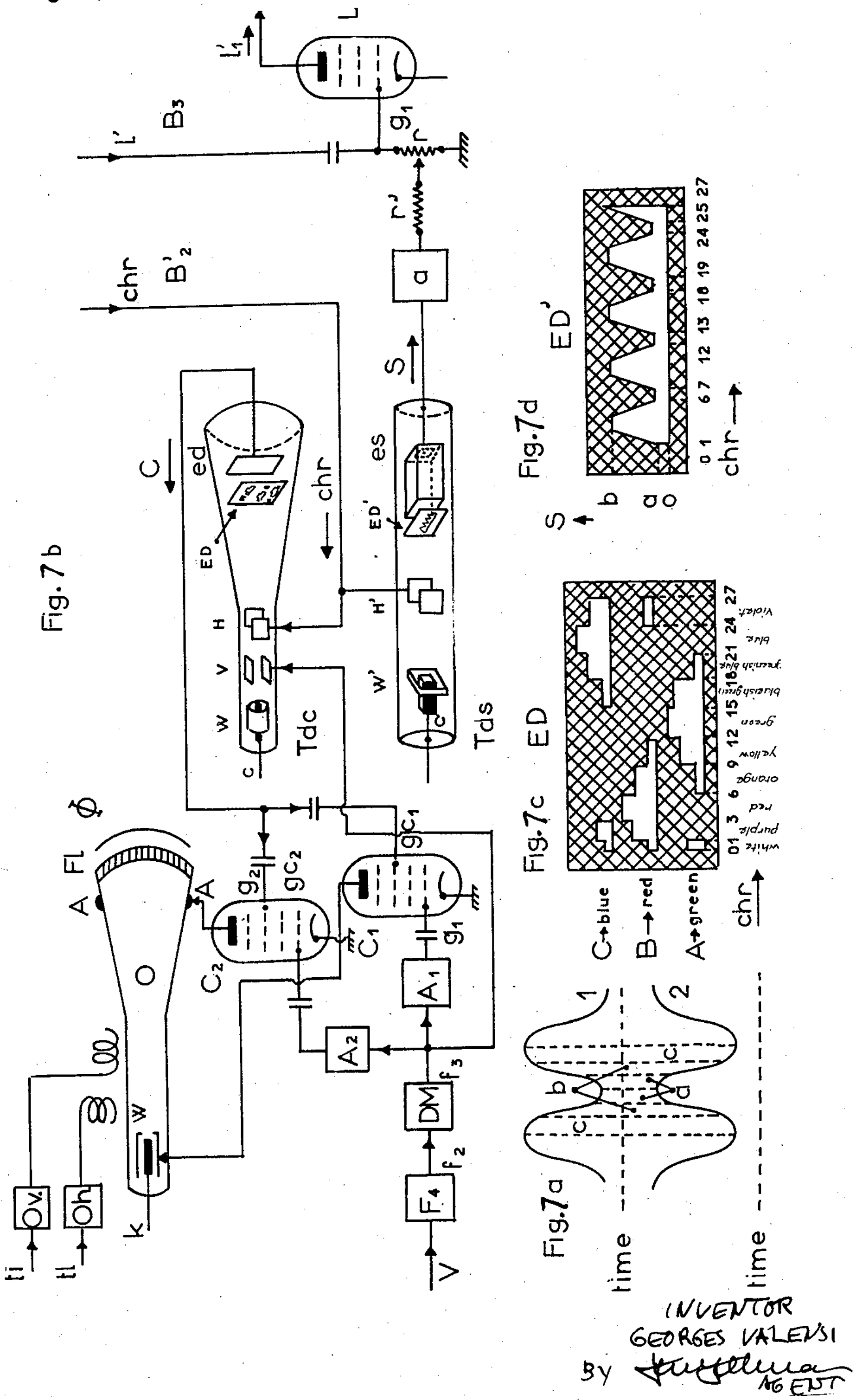
Figures 7, 7E:
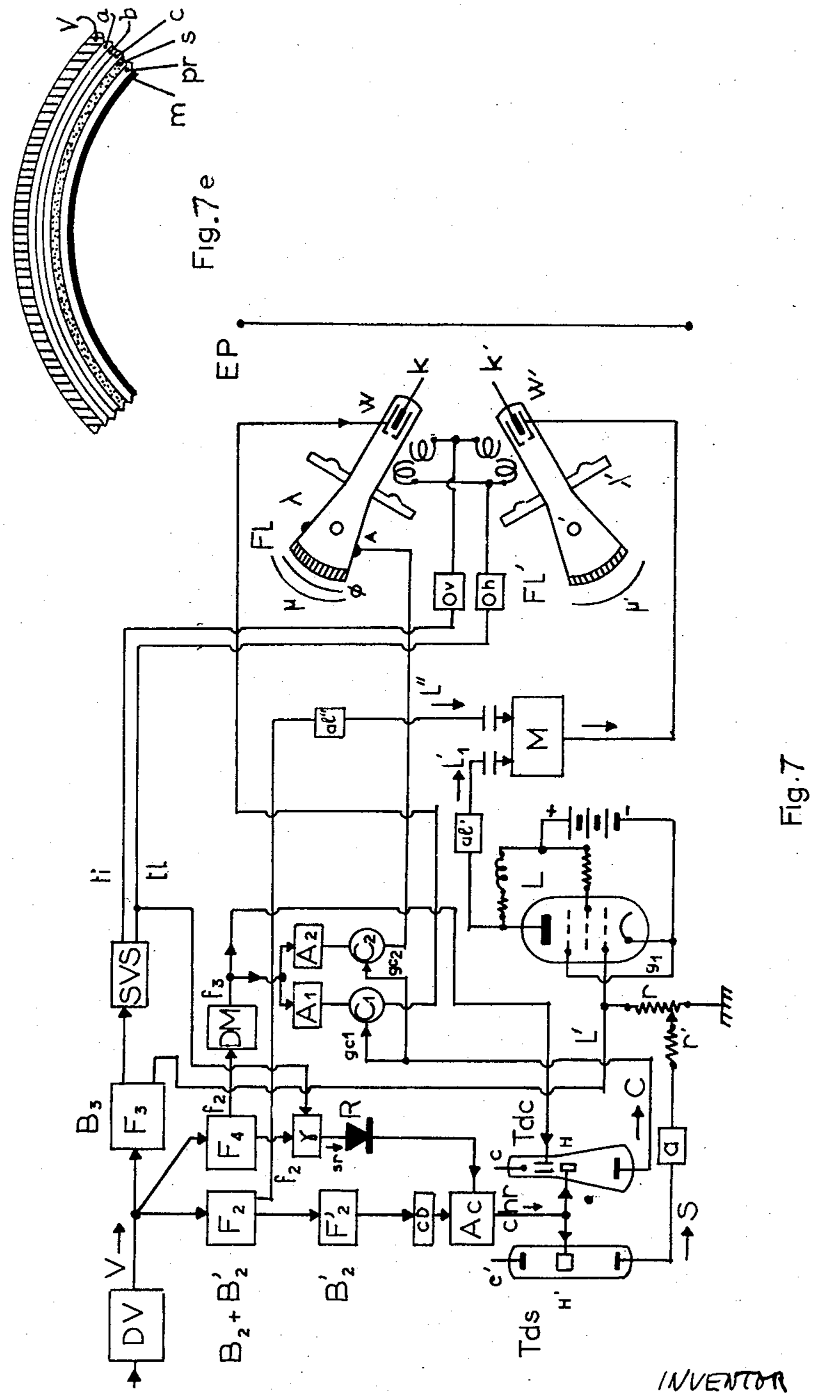

Figure 7 represents another arrangement for projecting colored pictures on a large projection screen EP, in which a cathode ray tube O′ produces a high definition black and white picture of the televised object, while another cathode ray tube O, having a stratified fluorescent screen $Fl$, a Wehnelt cylinder $w$ and a post accelerating electrode A produces a coarse colored picture of said object when appropriate voltages are applied to said Wehnelt cylinder $w$ and to said electrode A for exciting successively the fluorescence of the different layers of stratified screen $Fl$ emitting successively the primary colors. Figures 7–$a$, 7–$b$, 7–$c$, 7–$d$, 7–$e$ and 7–$f$ illustrate some parts of the arrangement shown on Figure 7.

Figure 2B:
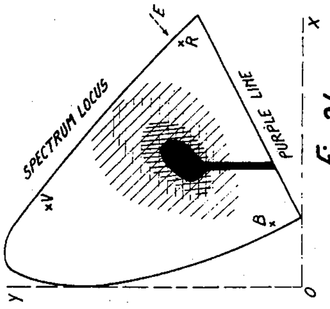
Figure 2 represents the transmitting station (based on the color triangles shown on Figures 2–*a* and 2–*b*) and Figure 3 represents the receiving station of the color television system adapted to radio-broadcasting, in accordance with the present invention.
Figure 2A:
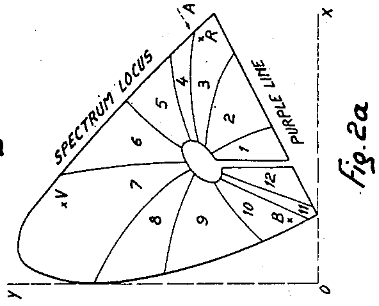
Figures 2, 2C:
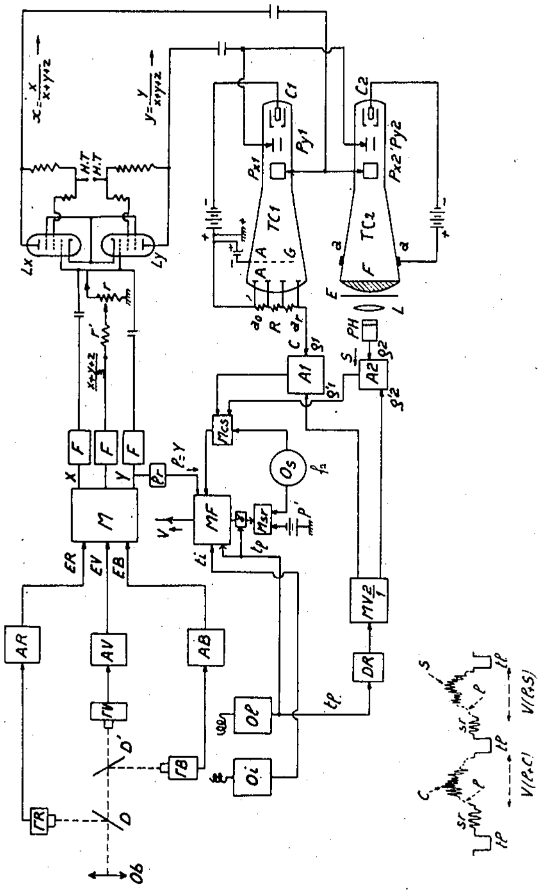
Figures 3, 3C:
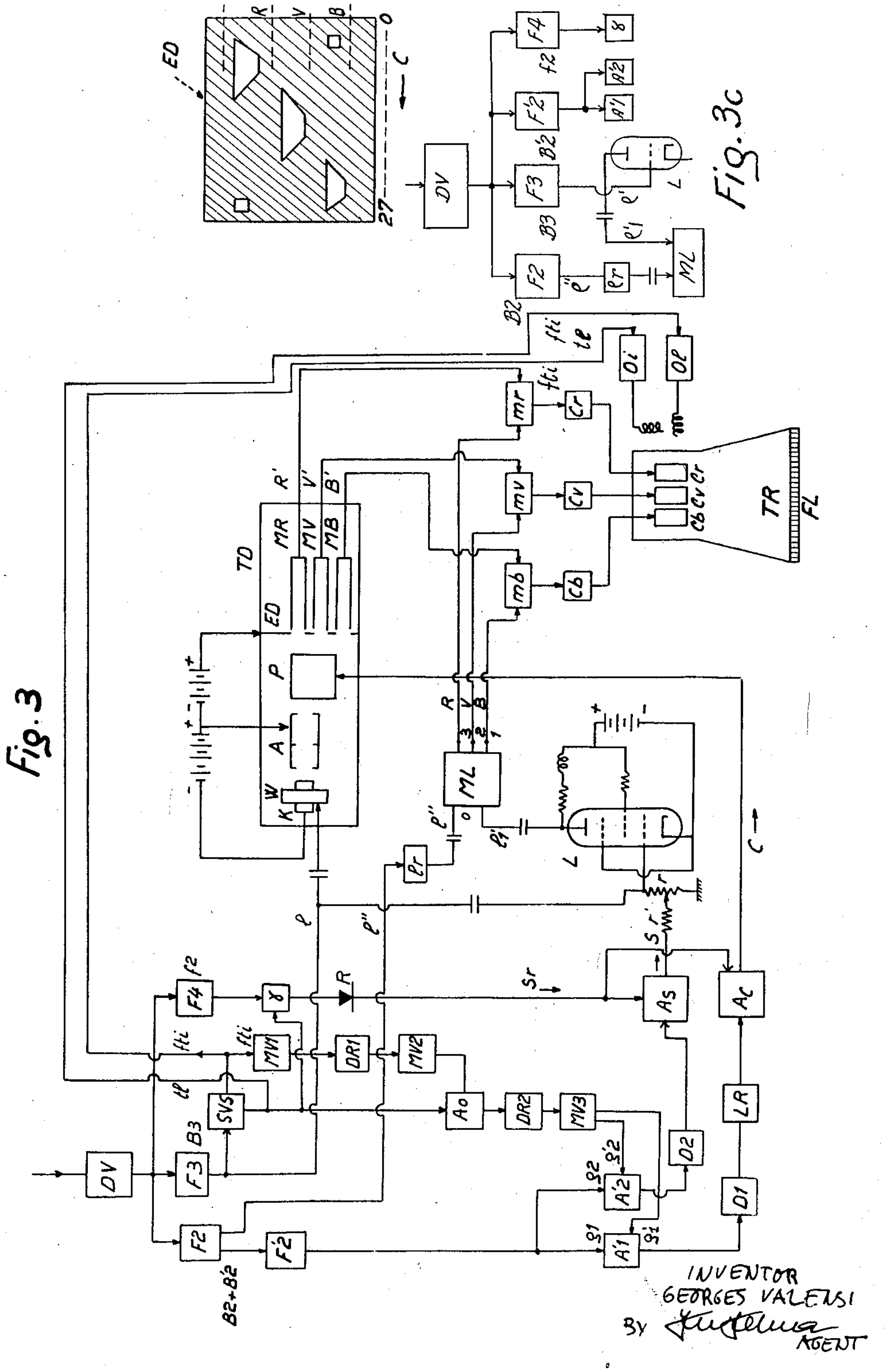
Figure 3B:
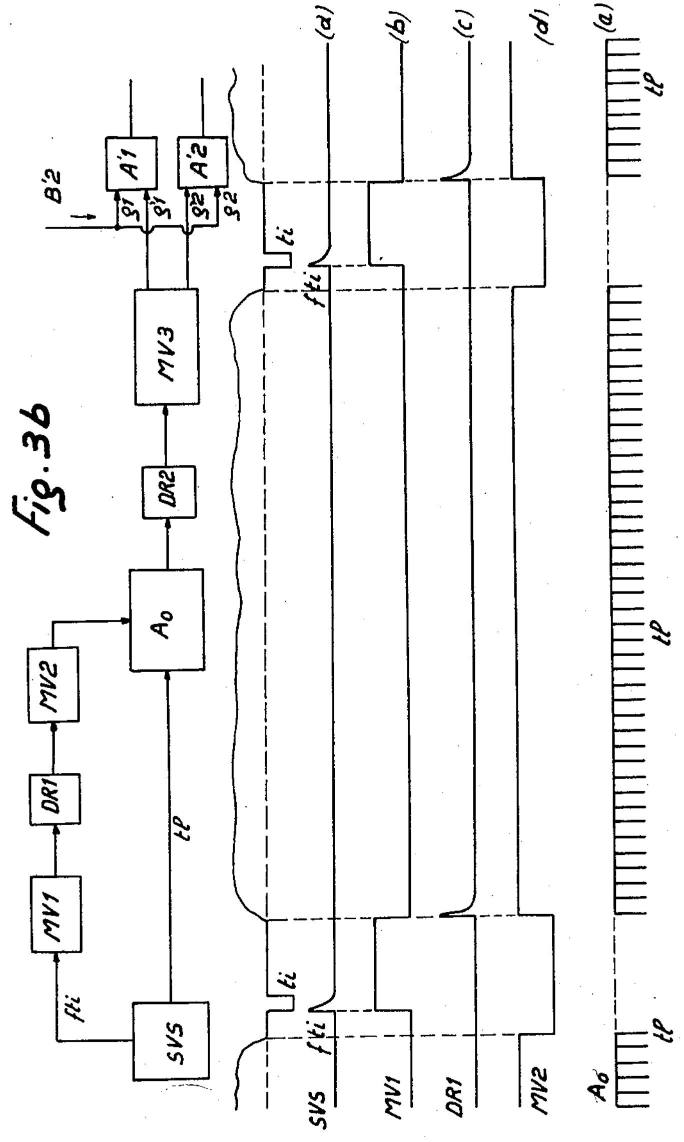
Figure 3A:
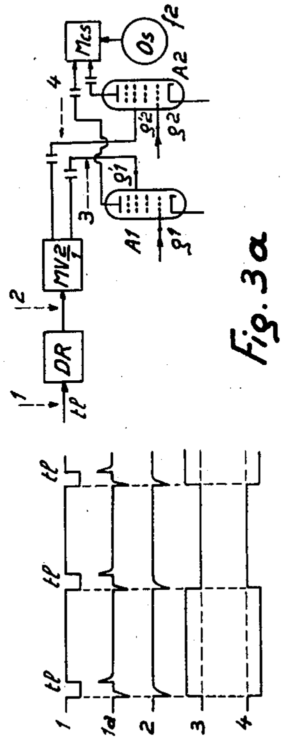
Figure 3D:
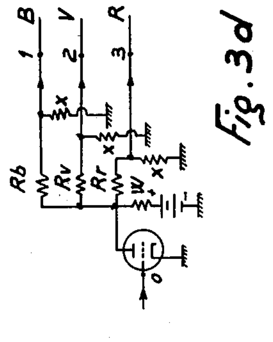

Figures 2 and 3 represent schematically the video-parts of the transmitting and receiving stations of a color television broadcasting system in accordance with the invention; the radiofrequency parts of said stations are not represented, but they are in conformity with the classical technique used in radio-broadcasting.

On Figure 2, $Ob$ is the objective producing, through dichroic mirrors DD′, three pictures (blue, green and red) of the televised object inside cameras ΓB (for blue), ΓV (for green) and ΓR (for red). The matrix M made of resistors transforms the primary signals $E_R$, $E_V$, $E_B$ produced by said cameras (after amplification through amplifiers AR, AV, AB passing the wide frequency band $B_1$ shown on Figure 1–$a$) in voltages X, Y and $$\frac{X+Y+Z}{3}$$

of the colorimetric reference system XYZ of the International Illumination Committee.

The voltage Y is precisely the luminance signal $l$ proportional to the brightness of the scanned point of the televised object. At the output of matrix M (and beyond the point where said luminance signal $l=Y$ is derived) are inserted three filters F passing only band $B_3$ (equal to band $B'_2$ containing all the chrominance spectrum on Figure 1–$a$). The purpose of these 3 filters F is to reduce the effect (on the chrominance signals C and S, see hereafter) of the background "noises" produced by cameras ΓB, ΓV, ΓR. After the corresponding filter F, the voltage $$\frac{X+Y+Z}{3}$$

polarizes, through potentiometer $r'r$, the control grids of pentodes $L_X$ and $L_Y$ in such a manner that the gain of said pentodes varies like $$\frac{1}{X+Y+Z}$$

The other voltages X and Y (after the corresponding filters F) are also applied to said control grids of pentodes $L_X$ and $L_Y$, and, consequently, voltages proportional respectively to $$x=\frac{X}{X+Y+Z}$$

and $$y=\frac{Y}{X+Y+Z}$$

are obtained at the output terminals of said pentodes $L_X$ and $L_Y$. $x$ and $y$ are precisely the trichromatic coordinates of the points representing respectively the hue and the degree of saturation of the color of the scanned elemental area of the televised object, on the chromaticity diagramms of Figures 2–$a$ and 2–$b$, B, V, R representing the primary colors associated with cameras ΓB, ΓV and ΓR and corresponding also to the luminescence of the phosphors used for the trichrome fluorescent screen $Fl$ of the viewing tube TR in the corresponding receiving station (Figure 3). These pentodes $L_X$, $L_Y$ (shown on Figure 2) replace the logarithmic formatrons ($Lg_1$, $Lg_2$, $Lg_3$) and the electronic substracters ($Sou_1$ and $Sou_2$) shown on Figure 1.

Figures 1, 1F:
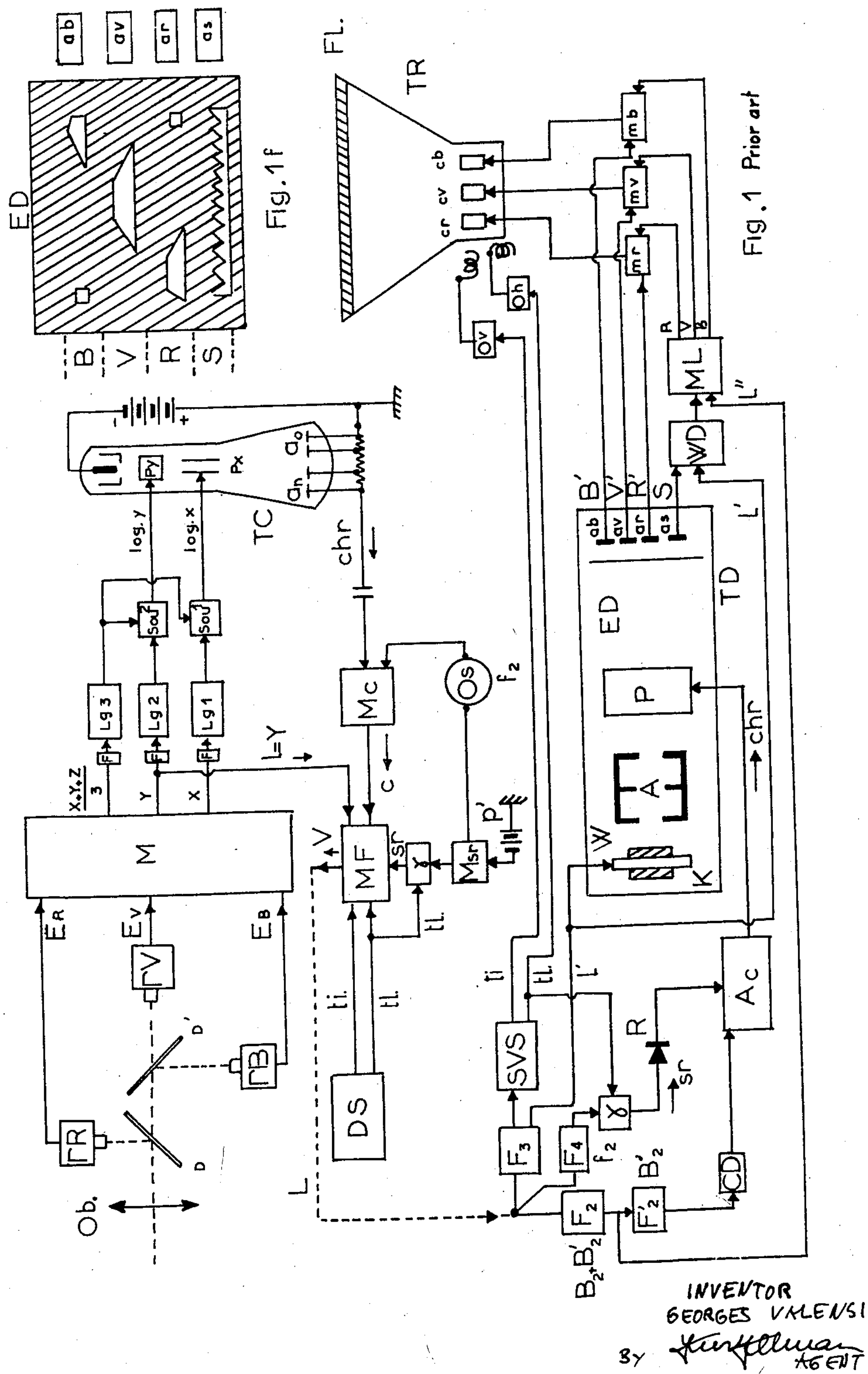
Fig.1f Fig.1 Prior art
Figure 1 is a schematic representation of the color television system described in U.S. Patent No. 2,920,131.
Figures 1B, 1C:
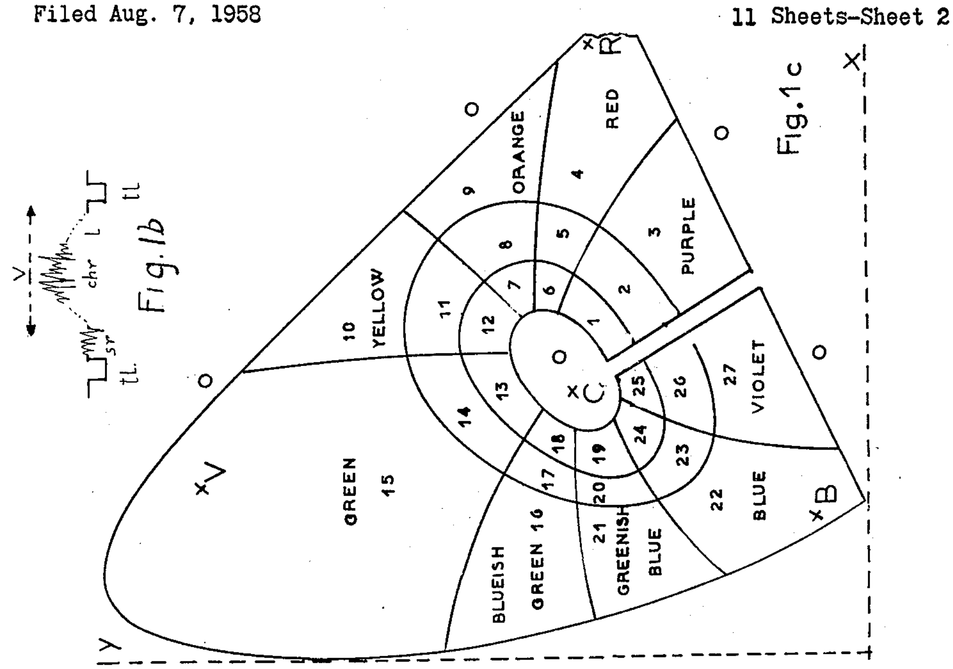
Figure 1A:
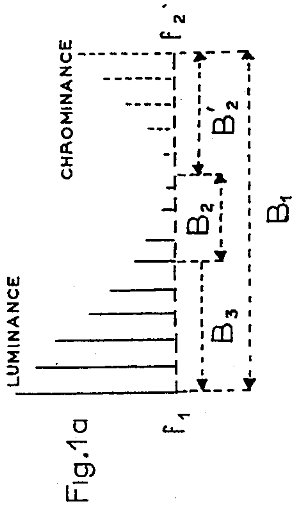
Figure 7F:
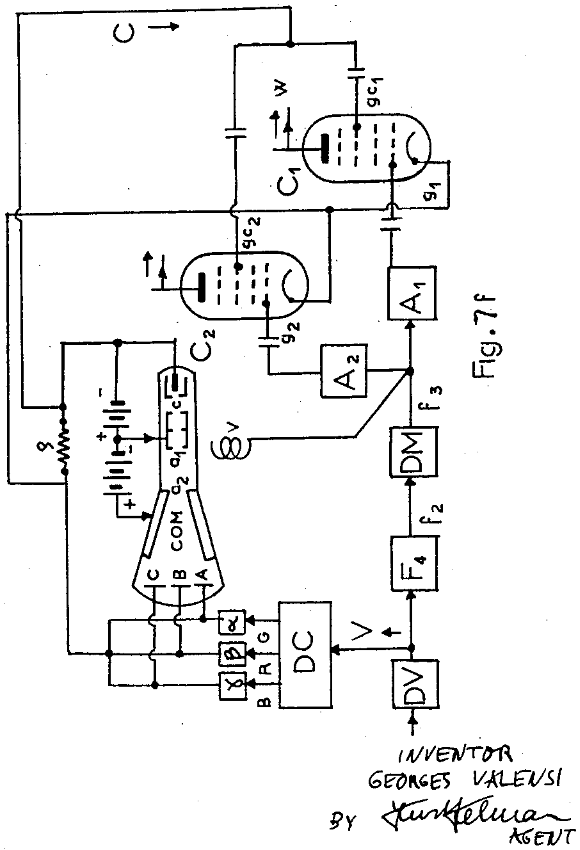

Two encoding tubes $TC_1$, $TC_2$ (Figure 2) are used simultaneously, instead of the single encoding tube TC of Figure 1; the voltages $x$ and $y$ are applied to the horizontally deflecting plates ($Px_1$, $Px_2$) and to the vertically deflecting plates ($Py_1$, $Py_2$) of said tubes $TC_1$, $TC_2$. Cathode ray tube $TC_1$ has a cathode $C_1$ emitting electrons, an accelerating anode at a high positive potential referred to said cathode, a final anode A made of metallic sectors electrically insulated from each other and connected to various points of an output resistor R. These sectors ($a_1, a_2 \ldots a_n$) have precisely the shapes of the correspondingly numbered sectors (1, 2 . . . 12) of the color triangle shown on Figure 2–$a$. A grid G (at an appropriate negative potential referred to said anode A) prevents the rebounding of electrons from the anode sector struck by the cathode ray beam towards the neighbouring anode sectors, so that the intensity of the cathode ray beam is always the same whatever anode sector is struck. Therefore at each instant, the signal C obtained at the output terminal ($a_n$) of tube $TC_1$ is the product of this intensity of said beam by the resistance of the portion of resistor R between point $a_0$ (voltage reference point) and the point where the struck anode sector is connected to said output resistor R. The connections between the various anode sectors and the various points of said resistor R are arranged in such a manner that signal C is proportional to the number of the sector of the color triangle (Fig. 2–$a$) of coordinates $x$, $y$ ($x$, $y$ being also the voltages applied to plates $Px_1$ and $Py_1$ of tube $TC_1$ at the considered instant), and consequently signal C carries the information concerning the hue of the color of the elemental area of the televised object scanned at said instant.

Tube $TC_2$ is a cathode ray tube with a fluorescent screen F and a post-accelerating electrode $a$ at a high fixed positive potential referred to cathode $C_2$ of said tube, in order to have a bright luminous spot where the electron beam impinges on screen F. Outside tube $TC_2$, but very close to screen F, is a screen E having a graded transparency as shown on Figure 2–$b$; the center (corresponding to white), as well as a narrow part corresponding to the space between sectors (1 and 12) of extreme numbers on Figure 2–$a$, is completely opaque; the transparency increases gradually when going towards the spectrum locus, or towards the purple line, that is to say when the degree of saturation of the color increases. The part outside the spectrum locus and the purple line is also opaque. Lens L condenses the light passing through screen E on the photo-sensitive surface of photo-multiplier PH. When voltages $x$, $y$ are applied to plates $Px_2$, $Py_2$ of tube $TC_2$, the signal S obtained at the output of photo-multiplier PH is proportional to the degree of saturation of the color of said scanned elemental area of the televised object.

C is the "hue chrominance signal" and S is the "saturation chrominance signal" corresponding to said elemental area.

$A_1$ and $A_2$ (Figure 2) are gated amplifiers which amplify successively signal C and signal S, $A_2$ being blocked by its gating grid $g'_2$ when $A_1$ has its gating grid $g'_1$ open and therefore amplified, and vice versa.

The color subcarrier (of frequency $f_2$, odd multiple of half the scanning lines frequency) generated by oscillator $Os$ is modulated in amplitude successively by signal C and signal S by means of modulator $Mcs$. This color subcarrier of frequency $f_2$ is modulated by the constant amplitude of battery $p'$ by means of modulator $Msr$, in order to produce (through electronic gate $\gamma$, controlled by the line synchronizing pulses $t_l$) the "amplitude reference signal $sr$" on the back porch of each line synchronizing pulse $t_1$. The luminance signal derived immediately before the filter F corresponding to Y goes through a local delay equalizer $r$.

This luminance signal $l=Y$, the field synchronizing signals $t_1$, the line synchronizing pulses $t_l$, the amplitude reference signal $sr$ are mixed successively with the auxiliary hue chrominance signal C and with the saturation chrominance signal S, by means of final electronic mixer MF, so that the oscillogram shown on Figure 2–*c* is obtained for two successive scanning lines, the composite video signal V combining $l+C$ during one scanning line, and $l+S$ during the following scanning line.

Figure 3–*a* represents (at its right side) the two gated amplifiers $A_1$, $A_2$, and (at its left side) the waves derived from the line synchronizing pulses $t_l$ and controlling the gating grids $g'_1$ and $g'_2$ of said amplifiers $A_1$, $A_2$.

The pulses $t_l$ (wave 1) are applied at the input of a differentiating-rectifying device DR which fulfills a "differentiating" operation (in the mathematical sense) producing wave 1*a*, and, later, a "rectifying" operation producing wave 2. This wave 2 is made of "pips" which trigger a multivibrator MV2/1 (of ratio 2 to 1) which produces (at two different output terminals) wave 3 and wave 4 (of opposite phases). These two waves (lines 3 and 4 at the left of Figure 3–*a*) are applied respectively to the gating grids $g'_1$, $g'_2$ of amplifiers $A_1$, $A_2$. Therefore, as stated above, signal C is obtained at the output of $A_1$ (Figure 2) during one scanning line, and signal S is obtained at the output of $A_2$ during the following scanning line, and so on.

In the video part of the receiving color television station (Figure 3), the spectrum of the composite video signal V carrying always the luminance signal *l*, and successively the hue chrominance signal C and the saturation chrominance signal S (during two successive scanning lines) is divided by filters $F_3$, $F_2$, $F'_2$ and $F_4$, as explained hereabove with reference to Figure 1, while synchro-video-separator SVS extracts the line synchronizing pulses $t_l$ and the steep fronts $ft_i$ of the field synchronizing signals $t_i$, and while electronic gate $\gamma$ (controlled by said pulses $t_l$) extracts the amplitude reference signal *sr* applied at the input of rectifier R. The gated amplifiers $A'_1$, $A'_2$ of the receiving station (Figure 3) correspond respectively to the gated amplifiers $A_1$, $A_2$ of the transmitting station (Figure 2), amplifier $A'_1$ being allotted to hue chrominance signal C, whereas amplifier $A'_2$ is allotted to saturation chrominance signal S. Both signals C and S are successively obtained at the output of filter $F'_2$ (during two successive scanning lines) and are applied to the control grid $g_1$, $g_2$ of amplifiers $A'_1$, $A'_2$ associated with detectors $D_1$, $D_2$. But a delay line LR (at the output of $D_1$) stocks detected signal C, and delays it during the duration of one scanning line, in order to put it in the same time position as the detected signal S corresponding to the same elemental area of the televised object and obtained at the output of $D_2$.

The arrangement shown on the top of Figure 3–*b* and producing the various waves represented at the bottom of said Figure 3–*b* secures the synchronism of the control of the gating grids of amplifiers $A_1$, $A_2$ in the transmitting station with the control of the gating grids of amplifiers $A'_1$, $A'_2$ in the corresponding receiving station.

The first oscillogramm of Figure 3–*b* represents a field of the television picture between two field synchronizing signals $t_i$, whereas the last oscillogramm represents a discontinuous sequence of line synchronizing pulses $t_l$. At the output of the synchro video separator SVS (Figures 3 and 3–*b*) are obtained: a continuous sequence of pulses $t_l$ and, from time to time, the field synchronizing signals $t_i$. By a well known process the steep fronts $ft_i$ of said signals $t_i$ are separated, as shown on line (*a*) of Figure 3–*b*. These "pips" $ft_i$ trigger the multivibrator $MV_1$ producing the wave represented on line (*b*). The differentiating and rectifying device $DR_1$ (germanium diode associated with a circuit producing the mathematical derivative of the voltage applied at the input) extracts, from wave *b*, the pips represented on line (*c*), which trigger the multivibrator $MV_2$ producing the wave represented on line (*d*). This wave is positive during each field of the televised picture and negative during the interval between two successive fields; this wave (line *d* of Figure 3–*b*) is applied to the gating grid of a gated amplifier $A_0$, to the control grid of which is applied the continuous sequence of line synchronizing pulses $t_l$ obtained at the output of device SVS. Consequently, at the output of amplifier $A_0$ is produced the discontinuous sequence of pulses $t_l$ shown on line (*e*) of Figure 3–*b*, said pulses $t_l$ existing now only during each field of the televised picture (and no more during the interval between two successive fields).

After amplifier $A_0$ (as in the transmitting station) the differentiating-rectifying device $DR_2$ and the multivibrator $MV_3$ produce (as explained with reference to Figure 3–*a*) two waves of opposite phases (at half the frequency of the pulses $t_l$) which are applied respectively to the gating grids $g'_1$, $g'_2$ of amplifiers $A'_1$, $A'_2$, while their control grids $g'_1$, $g'_2$ receive in parallel the color subcarrier modulated in amplitude successively by the hue chrominance signal C and by the saturation chrominance signal S.

TD (Figure 3) is a cathode ray tube comprising: a vertical rectilinear cathode K emitting a flat electron beam, the electrons being accelerated by anode A, a Wehnelt cylinder W surrounding cathode K, a pair of plates P for horizontally deflecting said flat electron beam, a decoding electrode ED (represented on the right of Figure 3) having 3 slits B, V, R behind which are located electron multipliers MB, MV, MR.

When signal $l'$ (part $B_3$ of the spectrum of the composite video signal $V=l+C$) is applied to Wehnelt cylinder W, while signal C (part $B'_2$ of said spectrum detected by $D_1$ delayed by LR, and amplified by amplifier $A_c$, the gain of which is automatically regulated by amplitude reference signal *sr*) is applied to deflecting plates P, the electronic image of cathode K (having an intensity proportional to the mean brightness of the scanned elemental area of the televised object) is positioned on a particular vertical line of decoding electrode ED where the widths of slits B, V, R have precisely values proportional to the (blue, green, and red) luminous fluxes to be mixed together for reproducing the hue of the color corresponding to signal C. Therefore, at any instant, the voltages (B', V', R') obtained at the output terminals of electron multipliers MB, MV, MR have precisely the values which it is desired to apply to the electron guns *cb*, *cv*, *cr* of the viewing tube TR for reproducing, on fluorescent screen *Fl* of said tube TR, the hue of the color of the elemental area of the televised object being scanned at said instant. When no signal is applied to $P(C=0)$ the electronic image of cathode K is on the solid part of ED, and $B'=V'=R'=0$.

Simultaneously the corresponding saturation chrominance signal S (obtained by means of detector $D_2$ at the output of amplifier $A'_2$ and amplified by amplifier $A_s$, the gain of which is automatically regulated by amplitude reference signal *sr*) produces, through potentiometer *r'r*, a polarization of the control grid $g_1$ of pentode L varying in such a manner that the gain of said pentode L is large when signal S is small and vice versa. To this control grid $g_1$ of said pentode L is also applied signal $l'$ (part $B_3$ of the spectrum of the composite video signal which contains the greatest part of the luminance); therefore the luminance signal $l'_1$ obtained at the output of pentode L and applied to the input of "luminance matrix M*l*" is large when S is small, and vice versa. To the input of said matrix M*l* is also applied the luminance signal $l''$ constituted by parts $B_2$ and $B''_2$ of the spectrum of the composite video signal (which corresponds to the small details of the drawing of the televised object), through a small delay equalizer *lr* compensating the small difference between the propagation times (through the circuitry of Figure 3) of the high frequencies and of the low frequencies.

Figure 3–*d* represents the constitution of said luminance matrix M*l* producing, at its output terminals (1, 2, 3), three voltages (B, V, R) proportional to the (blue, green and red) luminous fluxes to be mixed together for reproducing the white light corresponding to the luminance voltage $(l'_1+l'')$ applied at its input terminal 0.

If the trichromatic coordinates of the primary colors and of the conventional white (Illuminant C) used in the transmitting station (Figure 2) and in the receiving station (Figure 3) are the following:

$$\text{Blue B}\begin{cases}x=0.140\\y=0.080\end{cases}\qquad \text{Green V}\begin{cases}x=0.210\\y=0.710\end{cases}$$

$$\text{Red R}\begin{cases}x=0.670\\y=0.330\end{cases}\qquad \text{White C}\begin{cases}x=0.310\\y=0.316\end{cases}$$

the resistors constituting the luminance matrix M*l* (Figure 3–*d*) should have values $R_r$, $R_v$ and $R_b$ satisfying the following equations:

$$R_r+X=\frac{1}{3}\frac{W}{0.30}\qquad R_v+X=\frac{1}{3}\frac{W}{0.59}\qquad R_b+X=\frac{1}{3}\frac{W}{0.11}$$

The electronic mixers *mb, mv, mr* (Figure 3) receive each, at each instant, a "weighted" luminance component (B, V or R) corresponding to white light and produced by matrix M*l*, and a hue component (B', V' or R') corresponding to saturated colored light and produced by decoding cathode ray tube TD. The mixtures $(B+B', V+V', R+R')$, obtained at the output terminals of said electronic mixers (*mb, mv, mr*) respectively, have the right proportions of white light and colored light corresponding precisely to the hue and to the degree of saturation, as well as to the mean brightness of each elemental area of the televised object, the slight brightness variations corresponding to the small details of the drawing of said televised object being also included in said mixtures, which are applied (through gamma correctors C*b*, C*v*, C*r*) to the control electrodes of the 3 electron guns (*cb, cv, cr*) of the viewing cathode ray tube TR. (These gamma correctors serve to compensate the non-linearity, or "gamma," of the fluorescent materials constituting the trichrome fluorescent screen F*l* of said viewing tube TR.)

Figure 3–*c* shows another possible arrangement of filters $F_2$, $F'_2$, $F_3$ and $F_4$ of Figure 3 in which filter $F_2$ passes only band $B_2$ (see Figure 1–*a*) whereas filter $F'_2$ passes only band $B'_2$; with such an arrangement, the definition of the drawing of the televised object reproduced on fluorescent screen F*l* of viewing tube TR would be slightly impaired, but the reception of the colored pictures (in black and white only) on the usual receivers (adapted only to monochrome television) will be improved, because the "dot pattern" corresponding to the chrominance signals will no more interfere with the black and white picture obtained on said usual television receivers and corresponding only to the luminance signal.

The system for color broadcast television represented schematically on Figures 2 and 3 presents the following advantages.

(*a*) It is well adapted to the existing monochrome broadcast television transmitters having a range of linear variation of amplitude of 30 decibels only, because, as the hue chrominance signal C and the saturation chrominance signal S are transmitted successively, they can both use fully this range of amplitudes, so that the color triangle of Figure 2–*a* could be divided in 32 sectors corresponding to 32 different hues. Experience has shown that perfect colored pictures are obtained if 32 different hues and at least 4 different degrees of saturation can be discriminated from each other.

(*b*) The local generation, at the receiving station (Figure 3), of the voltages controlling the gating of amplifiers $A'_1$, $A'_2$ in perfect synchronism with the gating of amplifiers $A_1$, $A_2$ (Figure 2), said voltages being derived (at the receiving station) from the received line synchronizing pulses $t_l$ and from the steep fronts $ft_l$ of the received field synchronizing signals $t_l$, avoids the necessity of having an auxiliary switching signal before each scanning line (as is done in existing line sequential television systems); therefore the back porch of each line synchronizing pulse is entirely allotted to the amplitude reference signal *sr*, which is necessary for compensating the variations (against time) of the radio-propagation between the transmitting and receiving stations.

(*c*) This color broadcast television system is completely "compatible," and very good black and white pictures can be produced on usual monochrome television receivers by the signals transmitted for color television pictures.

Figures 4, 4A, 4B, 4C, 4D:
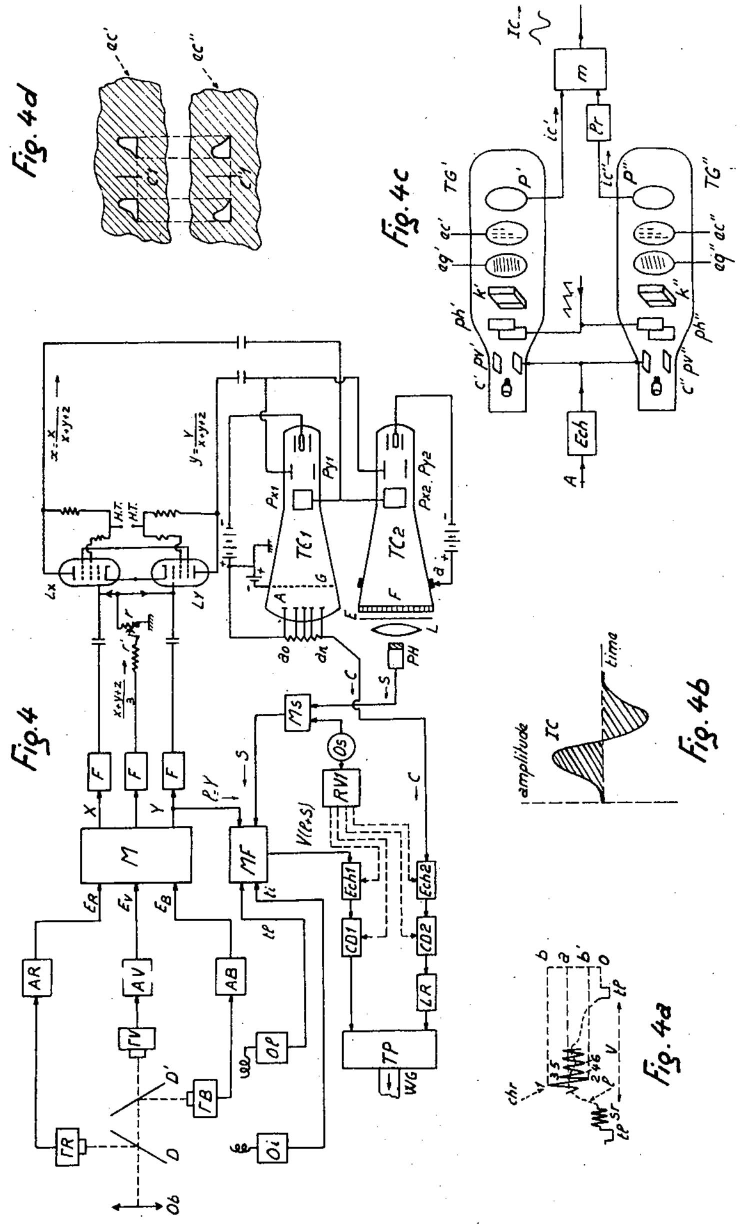
Figure 4 represents the transmitting station and Figure 5 the receiving station of the color television system adapted to a long distance waves-guide connecting said stations, in accordance with the present invention.
Figure 5:
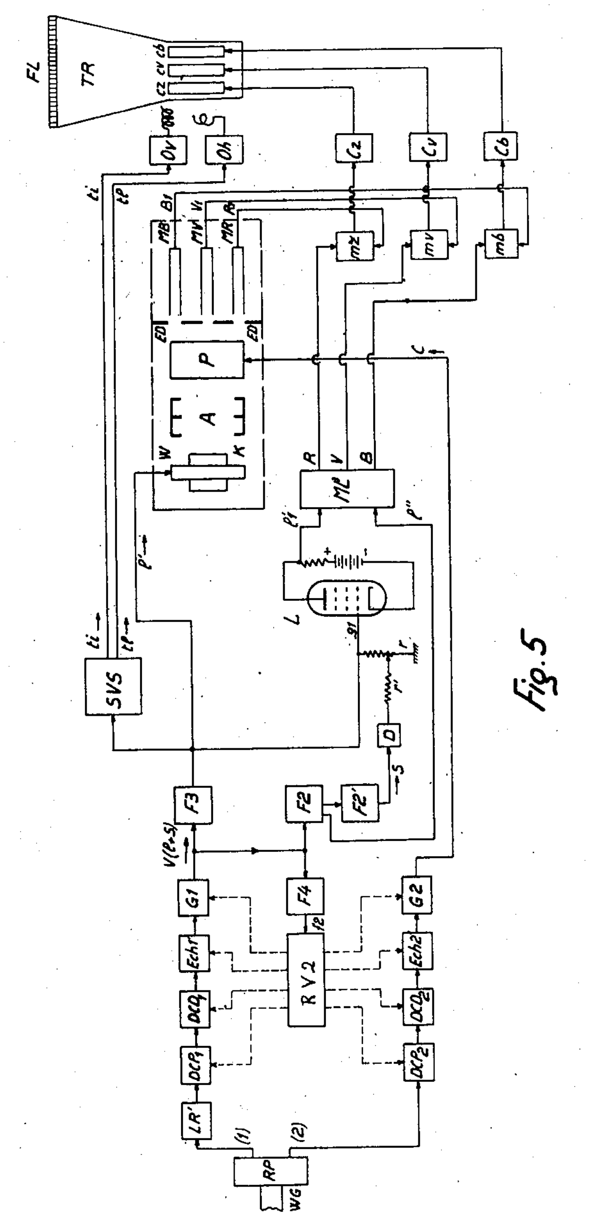

Figures 4 and 5 represent the transmitting and receiving stations of the color television system in accordance with the invention when a long distance wave-guide WG connects these stations together.

One of the claims of the U.S. patent application Serial No. 656,970, filed May 3, 1957, and entitled "Color Television Systems With Coding," concerns the transmission of composite video signals such as V and of amplitude reference signals such as *sr* (see Figure 4–*a*) through a wave-guide, with the minimum number of coded pulses, in the following manner. At the origin of the wave-guide a rectifying and shaping device RV, fed by the oscillator O*s* generating the color subcarrier wave, produces control pulses at a frequency double of the frequency of said color subcarrier and in phase with the maxima and minima of said modulated subcarrier, and these pulses control devices for sampling and coding (in accordance with the well known pulse code modulation process) only the maxima and minima of the composite video signals V and of the amplitude reference signals *sr* (Figure 4—*a*); at the end of said wave-guide, slicers shape in perfect rectangles the received coded pulses, and decoders reproduce (with said rectangular coded pulses) the maxima and minima of said composite video signals V, and of said amplitude reference signals *sr*.

On Figure 4–*a*, 1, 3, 5 . . . are the maxima of the composite video signal V, whereas 2, 4, 6 . . . are its minima. In binary pulse code modulation, if N is the number of coded pulses corresponding to a given sampled amplitude, the number of distinguishable discrete steps of quantization of said sampled amplitude is $2^N$; for example if $N=7$, the accuracy of reproduction of a given maximum (or minimum) amplitude shown on Figure 4–*a* is:

$$\frac{1}{2^N}=\frac{1}{128}\ (\text{about } 1\%)$$

If point 1 on said Figure 4–*a* corresponds to the maximum of all the amplitudes of the composite video signal V (that is to say to a point of the televised object having the maximum brightness with a color corresponding to the sector of maximum number in the color triangle), the difference of levels O*b* (between the level of point 1 and the reference level, point 0) would correspond to 128 discrete steps of quantization.

The maximum amplitude of the chrominance signal *chr* modulating the color subcarrier, and superposed to the luminance signal *l* cannot obviously exceed the maximum amplitude of said luminance signal *l* in order that the composite video signal V never goes below the reference level 0 (Figure 4–*a*); and, at a view point of overloading of the entire color television circuit, it is preferable if the amplitude of the subcarrier modulated by the maximum chrominance signal remains substantially smaller than the maximum amplitude of the luminance signal.

Therefore, instead of having a chrominance signal *chr* carrying both the hue information and the saturation information concerning each elemental area of the televised object as in U.S. Patent application Serial No. 656,970 based on the mapping of the color triangle 27 sectors as shown on Figure 1–*c*, it is preferable (in case of a color television transmission over a long distance waves-guide) to generate two different signals at the transmitting station, independently: the hue chrominance signal C and the saturation chrominance signal S, only signal C (or only signal S) modulating the amplitude of the color subcarrier for constituting the composite video-signal V, the other signal (S or C) not included in said signal V being transmitted separately. This is done on Figures 4 and 5, and this constitute the second object of the present invention.

Experience obtained in United States of America with the N. T. S. C. color television system shows that a variation of 10 degrees of the phase of the color subcarrier giving the hue, that is to say an error of $$\frac{10}{360}=\frac{1}{36}$$

is intolerable, whereas an error of 50% on the amplitude of the color subcarrier giving the saturation is often not noticeable; in other words, the human eye is much more sensitive to a difference of hue than to a difference of saturation.

Very high quality colored television pictures can be obtained in the following conditions: 10 levels of brightness, 4 levels of saturation and 32 levels of hue. In point to point industrial color television (a case which may occur often in the near future, when long distance wave-guides will make available cheap television channels with a bandwidth of about 4 megacycles per second), rather satisfactory colored pictures can be obtained in the following conditions: 6 levels of brightness, 2 levels of saturation, and 16 levels of hue. (This corresponds already to $2\times6\times16=192$ different retinian impressions for the observer.)

Taking into consideration the above mentioned points, it appears that, specially in case of long distance transmission over a wave-guide, there will be advantage in sending successively: a video composite signal V combining the luminance signal $l$ and the saturation chrominance signal S, and, immediately after, the hue chrominance signal C corresponding to the same elemental area of the televised object. This process (second object of the present invention) is illustrated by the appended Figures 4 and 5.

Figure 4 shows the objective O*b*, the dichroic mirrors D, D', the 3 cameras ΓB,ΓV,ΓR, the amplifiers AB, AV, AR, the matrix of resistors M, the 3 fiters F, the potentiometer $r'r$, the pentodes $L_xL_y$ and 2 encoding tubes $TC_1$, $TC_2$ producing the hue chrominance signal C and the saturation chrominance signal S, as explained hereabove with reference to Figure 2. The luminance signal $l=Y$ is derived at the output of matrix M; the line synchronizing pulses $t_l$ and the field synchronizing signals $t_l$ are derived from the saw-tooth generators $O_l$,$O_l$ producing the scanning of the photosensitive mosaics of cameras ΓB,ΓV,ΓR. The color subcarrier of frequency $f_2$ (odd multiple of half the scanning lines frequency) is modulated in amplitude by the saturation chrominance signal S through modulator M*s*, and this modulated wave is mixed, in electronic mixer MF, with the luminance signal $l$, in order to obtain the composite video signal $V(l+S)$ carrying the information of brightness and the information of degree of saturation of the color. The means for generating an "amplitude reference signal *sr*" on the back porch of each line synchronizing pulse $t_l$ are omitted on Figure 4; they would be the same as on Figure 2.

The wave of frequency $f_2$ produced by oscillator O*s* feeds the device $RV_1$ which produces control pulses at frequency twice of $f_2$, in order to time (in accordance with the well known technique of pulse code modulation) the encoding operations of sampler E*ch*1 and coder CD1 which sample and code the maxima and the minima of the composite video signal $V(l+S)$, and those of sampler E*ch*2 and coder CD2 for the hue chrominance signal C. Coder CD1 and CD2 produce respectively the groups of coded pulses $IC_1$ corresponding to the maxima and minima of $V(l+S)$ and the groups of coded pulses $IC_2$ corresponding to the maxima and minima of C. (The dotted lines of Figure 4 correspond to these timing operations.)

A delay line IR delays the pulses $IC_2$ carrying the hue information C in order to place them in a time position immediately after the pulses $IC_1$ carrying both the brightness information $l$ and the color saturation information S, this sequence of pulses $IC_1$ and $IC_2$ being later applied to the input of the transmitting panel TP at the origin of wave guide WG. In fact between the color television transmitting station and the transmitting panel TP of the long distance wave guide WG, there is necessarily a circuit (for example a coaxial pair in a cable of a moderate length) on which the coded pulses IC (such as $IC_1$ and $IC_2$, Figure 4) must be transmitted in the most favourable conditions, taking into account the delay distortion of said circuit.

To minimize the effects of this delay distortion (variation of the group propagation time versus frequency), the cut off at both edges of each of these rectangular pulses IC should be gradual. For this purpose, use may be made of shaping filters constituted by a single section of low pass-filter with a nominal cut-off frequency equal to the reciprocal of twice the width of a rectangular pulse IC, this filter having a response (to a rectangular pulse) such that the pulse, obtained at the output of said filter, has nearly the shape of a Gaussian curve. But, in accordance with the present invention, it is preferred to use for the coding means $CD_1$, $CD_2$ (Figure 4) the device made of two beam coders TG', TG'' of F.B. Lewellyn type shown on Figure 4—*c* and giving, at its output B, an alternating pulse IC having the shape shown on Figure 4—*b* instead of a positive rectangular pulse usually generated by ordinary beam coders. On Figure 4—*c* E*ch* represents the sampler (such as E*ch*1 or E*ch*2 on Figure 4) energizing the plates (*pv'*, *pv''*), vertically deflecting the beams of encoding cathode ray tubes TG', TG'', *c'*, *c''* being the electron guns with cathodes and Wenhelt cylinders, *ph'*, *ph''* the horizontally deflecting plates fed by a sawtooth wave generated by timing circuit $RV_1$ (Figure 4), *k'*, *k''* the secondary electron collectors, *eq'*, *eq''* the quantizing electrodes, *ec'*, *ec''* the encoding electrodes, and P', P'' the final collecting electrodes of said tubes TG', TG''.

Figure 4—*d* represents parts of encoding electrodes *ec'*, *ec''* of tubes TG', TG'', and shows the shape of their respective apertures, $c'_1$ and $c''_1$ being the electronic images of the cathodes of said tubes, scanning the perforated horizontal lines of said electrodes *ec'*, *ec''*. A small delay line *r* at the output of tube TG'' retards slightly the negative pulses *ic''* collected by plate P'' within tube TG'' in order to give them a time position immediately after the corresponding positive pulses *ic'* collected by plate P' within tube TG', whereby, at the output of mixer *m* (energized by *ic'* directly and by *ic''* through delay line *r*) an alternating pulse IC having the shape represented on Figure 4—*b* is obtained.

At the end of wave-guide WG (Figure 5) is the receiving panel RP feeding (through an electronic switch controlled by timing circuit $RV_2$ but not shown on Figure 5) successively two circuits 1 and 2 corresponding respectively to the received coded pulses $IC_1$ carrying the luminance information $l$ combined with the saturation chrominance information S in the composite video signal $V(l+S)$, and to the received coded pulses $IC_2$ carrying the hue chrominance information C. A delay line LR' retards the pulses $IC_1$ (first received) to give them on circuit 1 the same time position as for the pulses $IC_2$ (received later) on circuit 2. In order to correct the distortion of the received pulses due to the conversion and reconversion of the mode of vibration $TE_{01}$ of the electromagnetic waves travelling along wave-guide WG, these received pulses are reshaped by slicers $DCP_1$, $DCP_2$ which (in accordance with a well known technique) transform them in perfectly rectangular pulses, which are then decoded by decoders $DCD_1$ and $DCD_2$ of Shannon-Rack type. The outputs of these decoders are sampled by samplers Ech1′, Ech2′, and the samples reach electronic gates $G_1$, $G_2$. The wave of frequency $f_2$, extracted by filter $F_4$ out of the received composite video signal $V(l+S)$, feeds a device $RV_2$ producing the necessary pulses for timing (in the usual manner) decoders $DCD_1$, $DCD_2$ samplers Ech1′, Ech2′, and electronic gates $G_1$, $G_2$. (The dotted lines of Figure 7 correspond to these timing operations.)

The spectrum of the composite video signal $V(l+S)$ restored at the output of electronic gate $G_1$ is divided by filters $F_2$, $F_3$, $F_4$ and $F'_2$ as explained hereabove with reference to Figure 3. The path followed by the amplitude reference signal *sr* in the receiving station is not reproduced on Figure 5, but it would be the same as on Figure 3.

TD (Figure 5) is the hue decoding cathode ray tube; signal $l'$ (part $B_3$ of the spectrum of the video signal $V(l+S)$ energizes its wenhelt cylinder W, while hue chrominance signal C (obtained at the output of electronic gate $G_2$ energizes the deflecting plates P. ED is the decoding electrode provided with 3 slits B, V, R behind which the electron multipliers MB, MV, MR collect (and amplify) the signals B′ (blue), V′ (green) and R′ (red) proportional to the luminous fluxes (blue, green and red) to be mixed together for reproducing the hue of the color of the elemental area being scanned on the televised object.

The signal at the output of filter $F'_2$ (band $B'_2$ of the spectrum of the video signal $V(l+S)$ contains the information concerning the degree of saturation of the color of said elemental area; after detection through detector D, the saturation chrominance signal S is restored, and is applied (through potentiometer *r′r*) to the control grid $g_1$ of pentode L in order to make the gain of said pentode large when S is small, and vice versa. Signal $l'$ [band $B_3$ of the spectrum of the videosignal $V(l+S)$, at the output of filter $F_3$] contains nearly all the luminance energy, and is applied also to the control grid $g_1$ of pentode L, while signal $l''$ (bands $B_2$ and $B'_2$ of said spectrum) is applied to luminance matrix M*l*. This matrix receives also the "weighted" luminance signal $l'_1$ obtained at the output of pentode L. As explained here above with reference to Figure 3, this luminance matrix M*l* produces the components B (blue), V (green) and R (red) of the white light to be mixed (in electronic mixers *mb, mv, mr*) with the components B′ (blue), V′ (green) and R′ (red) of the saturated colored light of desired hue, obtained at the output of decoding tube TD.

The mixtures (B+B′), (V+V′), (R+R′) so produced are applied (through gamma correctors *Cb, Cv, Cr*) to the control electrodes of the 3 electron guns (*cb, cv, cr*) of the viewing tube TR with trichrome florescent screen *Fl*.

The synchro-video-separator SVS (Figure 5) extracts (from band $B_3$) the line synchronizing pulses $t_l$ and the field synchronizing signals $t_l$ for controlling the saw-tooth generators *Oh, Ov* producing the electrical scanning of the fluorescent screen *Fl* of viewing tube TR (Figure 5), in perfect synchronism with the scanning of the photosensitive mosaics of the cameras ΓB, ΓV, ΓR at the distant transmitting station (Figure 4).

The number of coded pulses ($IC_1+IC_2$) to be transmitted over wave-guide WG (in accordance with the Figures 4 and 5 of the present invention) is the following. For very high quality colored television pictures: 10 levels of brightness+4 levels of saturation making 10+4=14 levels for the composite video signal $V(l+S)$, 4 coded pulses $IC_1$ are needed; 32 levels of hue require 5 coded pulses $IC_2$; this makes a total of 4+5=9 coded pulses. In the N.T.S.C. system of color television used in United States of America, in order to transmit the composite video signal including a color subcarrier modulated in phase and in amplitude by two parameters I and Q (which is equivalent to 2 waves modulated only in amplitude, by I for one, and by Q for the other), a total of 2×7=14 coded pulses would be needed for the same quality of received colored pictures.

In the other case mentioned above (point to point industrial color television): 6 levels of brightness+2 levels of saturation making 6+2=8 levels for the composite video signal $V(l+S)$, 3 coded pulses $IC_1$ would suffice; 16 levels of hue would require 4 coded pulses $IC_2$; this makes a total of 4+3=7 coded pulses only.

There are many different manners of mapping the color triangle in sectors corresponding to the various chromaticities that the human eye can easily distinguish from each other. Figure 6–*a* represents a mapping scheme slightly different from the one shown on Figures 2–*a* and 2–*b*. Numbers 1, 2, 3, 4, 5, 6, 7 and 8 are given respectively to the following hues: yellow, orange, red, purple, violet blue, greenish blue, and green, whereas only two degrees of saturation are considered (marked respectively *a* and *b*, the transparency of zone *a* at the left of Figure 6–*a* corresponding to ordinate O*a* on Figure 6–*d*, the transparency of zone *b* corresponding to ordinate O*b* on said Figure 6–*d*, and the center of Figure 6–*a* (left) as well as the narrow zone corresponding to the space between sectors of extreme numbers 1 and 8 at the right of Figure 6–*a*, being perfectly opaque as well as the parts outside the spectrum locus and the purple line. A color television system (corresponding either to Figure 1, or to Figures 2 and 3, or to Figures 4 and 5) is assumed hereafter to be based on the mapping of the color triangle shown on Figure 6–*a*, and Figure 6 represents a part of its receiving station adapted to the projection of colored television system on a large projection screen EP, in accordance with the third object of the present invention. $B_3$, $B_2$, $B'_2$ are the 3 parts of the spectrum of the received signals (see Figure 1–*a*); the chrominance information is restored by the detection of band $B'_2$; band $B_3$ (having the same width as band $B'_2$) contains the greatest part of the luminance information, whereas band $B_2$ (and to a certain extent also band $B'_2$) contain information concerning the details of the drawing of the televised object. Figure 6 does not reproduce the part of the receiving station separating respectively the two components of the luminance ($l'$ corresponding to band $B_3$ and $l''$ corresponding to bands $B_2$ and $B'_2$), the chrominance *chr* (corresponding to band $B'_2$ detected), and the line synchronizing pulses *tl* and the field synchronizing signals $t_l$. Figure 6 assumes this separation already done.

Signal *chr* is applied to the deflecting plates P, P′ of two decoding cathode ray tubes T*dc* and T*ds*, which restore, as explained hereafter, the hue chrominance signal C and the saturation chrominance signal S. $l'$ is applied to the control grid $g_1$ of pentode L (acting as "luminance weighting device"), said grid being controlled also by the variable bias produced by saturation chrominance signal S. $l''$, and also the output $l'_1$ of pentode L, are applied to electronic mixer M.

O′ is a cathode ray tube with a fluorescent screen *Fl′* scanned under the control of saw-tooth waves generated by oscillator *Ov* (for vertical scanning) triggered by the received field synchronizing signals $t_l$, and by oscillator *Oh* (for horizontal scanning) triggered by the received line synchronizing pulses *tl*. The output of mixer M energizes the Wehnelt cylinder *w′* of tube O′; therefore the Schmidt optical system (made of spheric mirror μ′ and correcting lens λ′) projects, on screen EP, a large high definition black and white picture of the televised object, the desired amount of white light being regulated by pentode L under the control of signal S.

The field synchronizing signals $t_l$ synchronize also the motion of electric motor M*o* mechanically connected with the shaft of the rotating mirror drum TM scanning optically screen EP with the luminous rays emitted by source Σ through color modulators K, K′, whereby a coarse colored picture of the televised object is superposed on the high definition black and white picture of said televised object.

As shown in perspective on Figure 6, tube T*dc* contains a vertical rectilinear cathode C emitting a flat beam of electrons, an anode A at a high positive potential referred to cathode C, a Wehnelt cylinder W, a pair of plates P for horizontally deflecting said beam, a decoding electrode ED represented on Figure 6–*c* and a collecting electrode *ec*. Tube T*ds* contains a vertical rectilinear cathode C′ emitting a flat beam of electrons, an anode A′ at a high positive potential referred to cathode C′, a Wehnelt cylinder W′, a pair of plates P′ for horizontally deflecting said beam, a decoding electrode ED′ represented on Figure 6–*d*, an electron multiplier *ms* and a collecting electrode *es*.

For producing the coarse colored picture of the televised object on screen EP, use is made of electrical color modulators (based on electrical birefringence), acting on the luminous rays produced by the powerful source of white light Σ (for example, an electric arc); these devices can be Kerr cells with nitrobenzene or phenyl mustard oil; but preferably, crystals of dihydrogen ammonium phosphate $NH_4H_2PO_4$ or other crystals of the type $XH_2PO_4$, or crystals of dihydrogen ammonium arseniate $NH_4H_2AsO_4$, are used.

In Figure 6, K and K′ represent two crystals of dihydrogen ammonium phosphate, cut perpendicularly to the crystallographic axis Z ("Z cut crystals"). If an electric field is applied parallel to the Z direction, these crystals (orginally uniaxial) become biaxial; the plane of the optic axes is independent of the magnitude of the voltage V applied to the electrodes (α or α′) and is inclined at 45° to the crystallographic axis Z; for luminous rays parallel to the electric field and at a given wave-length, a retardation (or phase shift) is produced through the crystal plate; this retardation is practically linearly proportional to the applied voltage V, and is independent of the plate thickness. For a field applied at right angle to the crystallographic axis Z (for example, in the X direction), the crystal would also become biaxial; but the retardation change through the plate (for rays parallel to the electric field) would depend on the square of the applied voltage and the inverse first power of the plate thickness. The only large birefringent effects take place in a basal section of such crystal with the field in the Z direction.

K and K′ (Figure 6) are therefore such Z cut plates (perpendicular to the crystallographic axis); by metallic evaporation, ring electrodes α, α′ have been previously deposited on their parallel translucent faces; the beam of parallel white light rays (produced by source Σ located at the focus of lens $l_1$) goes through polariser P, through a birefringent crystal plate L producing a fixed retardation $\delta_1$, through the ring electrodes α of crystal plate K, through analyser A, through the ring electrodes α′ of crystal plate K′ (for which A acts as a polariser), through analyser A′, and through lens $l_2$ producing a colored luminous point on projection screen EP, after reflection on one of the mirrors of rotating mirror drum TM. This drum TM is a cylinder having on its surface a plurality of mirrors making, progressively increasing angles, with the axis of this drum (which is mechanically connected with the shaft of electric motor M*o*), so that said luminous point (at the focus of lens $l_2$) scans optically the successive horizontal lines of screen EP when motor M*o* rotates.

In order to have the maximum brightness of this colored luminous point produced on screen EP, analyser A is preferably crossed with polariser P, the principal directions of crystal plate L are at 45 degrees from polariser P, analyser A′ may be indifferently either parallel to P, or crossed with P.

The hue chrominance signal C (at the output of tube T*dc*) is applied, through amplifier AC, to the ring electrodes α of crystal plate K. If V is the electric voltage applied to said electrodes at a given instant, luminous rays perpendicular to the faces of crystal K (and therefore parallel to the electric field produced by said voltage V) are retarded in their passage through the crystal; the retardation so produced is $pV$ (linearly proportional to V), $p$ being a constant; if G designates the gain of amplifier AC, $V=GC$; consequently the total retardation produced between polariser P and analyser A by crystal plate L and crystal plate K is: $\delta=\delta_1+pGC$ The following Table 1 gives, for each value of retardation δ expressed in millimicrons, the color of the light emerging from analyser A.

| Total retardation $\delta=\delta_1+pGC$ in millimicrons | Color of light emerging from analyzer [1] | Number of this color in Newton's scale | Differences for δ (in milli-microns) |
|---|---|---|---|
| 259 | white | 7 | 0 |
| 332 | yellow | 12 | 73 |
| 430 | yellowish orange | 13 | 181 |
| 505 | reddish orange | 14 | 246 |
| 536 | red | 15 | 277 |
| 565 | purple | 17 | 306 |
| 575 | violet | 18 | 316 |
| 664 | blue | 20 | 405 |
| 728 | greenish blue | 21 | 469 |
| 747 | green | 22 | 488 |

[1] The colors mentioned in this table belong to the first and second orders of Newton's scale; they are not saturated.

With reference to the color triangle (Figure 6–*a*), the above table shows that, if crystal plate L produces by itself a retardation $\delta_1=259$ millimicrons, a yellow color will be obtained at the output of analyser A when crystal K produces (by itself) a retardation of 73 millimicrons, a red color will be obtained if the latter retardation is 277 millimicrons, a blue color will be obtained for 405 millimicrons, and a green color for 488 millimicrons.

The corresponding values of hue chrominance signal C must be such that their products by the constant coefficient ($pG$) are precisely these numbers of millimicrons respectively, while the corresponding values of the signal *chr* are proportional to the numbers of the corresponding sectors of Maxwell's color triangle (Figure 6–*a*).

It is therefore easy to plot curve C (Figure 6–*c*) giving the necessary relation between the received signal *chr* in abscissa and the hue saturation signal C multiplied by $pG$ in ordinates. Referring again to Figure 6–*a*, and assuming that ordinates O*a* and O*b* (at the bottom of Figure 6–*d*) represent the smallest and the biggest degrees of saturation of color which are desired, it is easy to plot curve S (Figure 6–*d*) giving the necessary relation between the saturation chrominance signal S and the received signal *chr*. The hatched parts of Figures 6–*c* and 6–*d* represent the solid portions of decoding electrode ED and ED′ of tube T*dc* and tube T*ds* (Fig. 6). At a given moment, signal *chr* acting on deflecting plates P, P′ of tubes T*dc* and T*ds*, positions the electronic images of cathodes C and C′ on particular vertical lines of electrodes ED and ED′, for example along line P (Figures 6–*c* and 6–*d*) which corresponds to a point in sector 3 (Figure 6–*a* right) and in zone *a* (Figure 6–*a* left), that is to say to a nonsaturated red color. Figures 6–*c* and 6–*d* show that the hue chrominance signal C (produced on *ec* by the electrons going through slit C of electrode ED) has then the value $$\frac{277}{pG}$$

(arbitrary units), while the saturation chrominance signal S (produced on *es* by the electrons going through slit S of electrode ED′) has the value O*a* corresponding to a small saturation. Table 1 shows that this value of C corresponds precisely to a nonsaturated red color.

This saturation chrominance signal S (see Figure 6) is applied (through amplifier *a* and potentiometer *r′ r* to the control grid $g_1$ of pentode L, and produces a bias such that the gain of said pentode L is large when S is small and vice versa. To said grid $g_1$ is also applied the main energy of luminance $l'$, and the output potential of said pentode L is transferred to mixer M (and further to the Wehnelt cylinder $w'$ of tube $O'$), through amplifier $a'$ making $w'$ positive when S is small and negative when S is large. For the considered elemental area having an unsaturated red color, S being small, the "weighted luminance signal $l'_1$ is great, and cathode ray tube O' adds a substantial amount of white light to the unsaturated red light emerging from analyser A, passing unaltered through crystal K' and analyser A' (as explained hereafter) and thrown by lens $l_2$ on projection screen EP after reflection on mirror drum TM.

Figure 6 shows that signal S is also applied to control grid $g$ of triode T, which is negatively biased by a battery $b$ in such a manner that no substantial current circulates in the plate resistor $r$ as long as S does not reach a certain threshold corresponding to ordinate O$b$ on Figure 6–*d*. Therefore, for unsaturated colors, the following inversing triode I receives on its grid a high positive potential and its plate conveys to blocking electrodes $gc'$, $gc''$ of gated amplifiers AC', AC'' a very negative potential; consequently the potential differences V' across resistor R' (at the ouput of amplifier AC') and V'' across resistor R'' (at the output of amplifier AC'') are negligible; a very negligible voltage exists across the ring electrodes $\alpha'$ of crystal plate K' in series with said resistors R' and R''; no appreciable electric field is applied to said crystal K', and the luminous rays emerging from analyser A go through it without any appreciable retardation, as stated above. Finally, it appears clearly that the color obtained on screen EP for the corresponding elemental area of the picture of the televised object is a nonsaturated red (color No. 15 in Newton's scale), having a spectral curve (amplitude of vibration versus wave length) like curve 1 of Figure 6–*b*, $\lambda_0$ being the wavelength of dominant monochromatic radiation.

It is now assumed that the scanned elemental area of the televised object has a very saturated red color corresponding again to sector 3, but (this time) to zone $b$ on the color triangle of Figure 6–*a*. In this case, the electronic images of cathodes C, C' of decoding tubes T$dc$ and T$ds$ will be posiioned on the particular lines of electrodes ED and ED' along Q; the hue chrominance signal C will have the same value as above and again the color of the light emerging from analyser A will be an unsaturated red (curve 1 of Figure 6–*b*); but the saturation chrominance signal S will then have its maximum value corresponding to ordinate O$b$ on Figure 6–*d*; the weighted luminance signal $l'_1$ will be very small, and cathode ray tube O' will practically contribute to the picture on projection screen EP only through the signal $l''$ corresponding only to the small details of the drawing of the televised object inside the considered elemental area of said picture. At the same time, as saturation chrominance signal has a great value (greater than the above mentioned threshold), the plate current of triode T is large, and inverting triode I opens the blocking grids $gc'$ and $gc''$ of gated amplifiers AC' and AC''. Amplifier AC' has its control grid energized by the output GC of amplifier AC, and the potential difference produced across the output resistor R' is $GC\times G'$, if $G'$ is the gain produced by AC'. Amplifier AC'' has its control grid raised, by a fixed battery B, at a fixed positive potential B relatively to the cathode, and the potential difference produced across the output resistor R'' is BG'', if G'' is the gain produced by AC''. Therefore the total voltage applied to the ring electrodes $\alpha'$ of crystal plate K' is: $GCG'+BG''$.

As stated above, the total retardation produced by crystal plate K on the luminous rays emitted by source $\Sigma$ on their path between polariser P and analyser A is $\delta=\delta_1+pGC$ (with $\delta_1=259$ millimicrons). The total retardation produced by crystal plate K' on said rays on their path between analyser A (acting as polariser) and analyser A' is $\delta'=p\times(BG''+GG'C)$.

In accordance with the well known theory of Bernard Lyot's monochromator, if $\delta'=2\delta$, the spectral curve of the color emerging from A' has the shape of curve 3 of Figure 6–*b*, the ordinate of which is the product of the ordinate of curve 1 (corresponding to retardation $\delta$ produced between P and A considered alone) and of the ordinate of curve 2 (corresponding to the retardation $\delta'$ produced between A and A' considered alone). It is apparent that curve 3 (Figure 6–*b*) characterizes a very saturated color of the same dominant monochromatic radiation as the unsaturated color characterized by curve 1. The equation $$\delta'=2\delta$$

or $$p(BG''+GG'C)=2(\delta_1+pGC)$$

becomes an identity, and therefore is valid for all the elemental areas of the televised object having saturated colors, if the fixed value of B and the gains G, G', G'' are such that:

$$\begin{cases} 2\delta_1=pG''B \text{ (with } \delta_1=259 \text{ millimicrons)} \\ G'=2 \end{cases}$$

Figures 6–*c* and 6–*d* show that for a white (or black) elemental area of the televised object (central part of the color triangle of Figure 6–*a*) the hue chrominance signal C and the saturation chrominance signal S are both equal to zero. Therefore no electric field is applied either to crystal K or to crystal K'; no colored light is projected on screen EP; on the other hand, practically the full received luminance ($l'_1+l''$) is applied (through mixer M) to the Wehnelt cylinder $w'$ of cathode ray tube O'; therefore, in case of a white elemental area being scanned at the transmitting station, a corresponding purely white area will be produced for the picture obtained on projection screen EP.

If, as shown on Figure 1–*b*, a positive polarity is used for the composite video signal V (an increase of luminance corresponding to a positive pulse, while line synchronizing pulses $t_l$ between two successive scanning lines, and also field synchronizing signals $t_i$ between two successive fields are negative), Figure 6 shows that, during the occurrence of said negative synchronizing signals or pulses, as signal *chr* does not exist, signals C and S are equal to zero, no field is applied to crystal plate K, and triode T as well as amplifiers AC' and AC'' being also inactive, no field is applied to crystal plate K'. As these synchronizing signals are periodic, there is no risk that said crystal plates K and K' remain under strain a too long time.

The low frequency negative synchronizing signals $t_l$ and $t_i$ applied to control grid $g_1$ of pentode L cut off the plate current of said pentode L; these low frequency negative synchronizing signals $t_l$ and $t_i$ cannot reach fully, the Wehnelt cylinder $w'$ of cathode ray tube O', although their steep fronts can produce some transients on said Wehnelt cylinder $w'$; it may therefore be appropriate to use a classical blanking generator (not shown on Figure 6) for cutting off the beam in O' during the occurrence of said synchronizing signals.

Crystal plates K and K' do not consume much current because they offer a great resistance between their respective ring electrodes ($\alpha$ or $\alpha'$); but great and rapidly varying potential differences must be applied between said electrodes in order to obtain the desired range of color modulation; consequently AC, AC' and AC'' are necessarily powerful amplifiers.

In the case of the color television system represented on Figure 1, the received signal *chr* on Figure 6 is a coded color signal representing both the hue and the degree of saturation, in conformity with color triangle of Figure 1–*c* for example.

In the case of the color television system represented on Figures 2 and 3, signal *chr* is the hue chrominance signal C during one scanning line and the saturation chrominance signal S during the following scanning line, use being made naturally of delay line LR of Figure 3.

In the case of the color television system represented on Figures 4 and 5, the decoding cathode ray tube T*dc* (Figure 6) must be substituted to decoding tube TD of Figure 5.

Figure 7 represents another arrangement for color television on a large projection screen EP. In order to simplify the drawings, it is assumed that the corresponding transmitting station sends the composite video signal V combining a color subcarrier modulated by the chrominance signal *chr* which carries information for both the hue and the saturation, together with the luminance signal *l*, the amplitude reference signal *sr*, the line synchronizing pulses $t_l$, and the field synchronizing signals $t_t$ (see Figure 1–*b*); it is assumed also that the color triangle is mapped as shown on Figure 1–*c*.

But Figure 7 could readily be amended in case of the color television systems represented respectively on Figures 2 and 3, or on Figures 4 and 5.

This being understood, Figure 7 shows a cathode ray tube O′ (with a fluorescent screen F*l*′) projecting on screen EP (by means of the Schmidt optical system made of spheric mirror $\mu'$ and correcting lens $\lambda'$) a high definition black and white picture of the televised object, the electrical scanning of said fluorescent screen being accomplished by means of saw-tooth generators O*v* and O*h* synchronised respectively by the field synchronizing signals $t_t$ and the line synchronizing pulses $t_l$ extracted, by synchro-video-separator SVS, at the output of filter $F_3$ passing band $B_3$ of the received composite video-signal V. Again, the received color subcarrier modulated by the chrominance signal *chr* at the output of filter $F'_2$ (passing band $B'_2$), is detected by CD; at the output of detector CD, signal *chr* goes through amplifier $A_c$, the gain of which is automatically regulated by the received amplitude reference signal *sr* (rectified by R) in order to compensate the variations (against time) of the transmission over the link connecting the color television transmitter and receiver; signal *chr*, at the output of $A_c$, has again the value it had at the beginning of said link, this value representing both the hue and the degree of saturation of the elemental area (of the televised object) being scanned.

In the case of the color television receiving station shown on Figure 7, use is made of a special cathode *tay* tube O for producing a coarse colored picture of the televised object, superposed on projection screen EP (by means of Schmidt optical system $\mu$, $\lambda$), on the detailed black and white picture of said object produced simultaneously by cathode ray tube O′.

The fluorescent screen F*l* of tube O is constituted as shown on Figure 7–*e*. On the glass *v* are settled 3 successive layers (*a, b, c*) of fluorescent materials in very small particles emitting respectively three different primary colors (for example blue, green and red) when excited as indicated hereafter; on this stratification is another layer (*s*) of a substance emitting ultra violet radiations (in the range of 3000 to 4000 Angstroms preferably) when electrons impinge on it; this layer *s* is eventually protected, against evaporation in vacuum, by a thin layer *pr* of protecting material; the outer surface of layer *s* (or of layer *pr* if it exists) is metallized (metal film *m* on Figure 7–*e*) in order to conduct back to the cathode *k* of tube O the electrical charges left by the electrons having impinged on screen F*l*. Said screen F*l* is scanned by the cathode ray beam inside tube O in perfect synchronism with the scanning of screen F*l*′ inside tube O′, because the same generators (O*h*, O*v*, Figure 7) produce the saw-tooth waves simultaneously applied to the beam deflecting devices associated with tubes O and O′ respectively.

The substance constituting layer *s* may be either organic or inorganic, but should emit ultra violet radiations when struck by electrons. As organic substance use can be made of pure polystyrene (previously irradiated in order to be reticulated and more heat resisting) or another material having, for molecule, a chain of benzenic nucleus. As inorganic substance use can be made (for layer *s*) of one substance in the following table, for example

| Substance | Activator |
|---|---|
| Sodium chloride NaCl | Silver Ag, gadolinium Gd. |
| Sodium or potassium bromide NaBr, KBr | Silver Ag. |
| Aluminium, or calcium, or lanthane, or strontium, or thorium fluoride $AF_3$, $CaF_2$, $LaF_3$, $SrF_2$, $ThF_4$. | Cerium Ce, gadolinium Gd. |
| Baryum silicifluoride $Ba_3(SiO_3F)_2$ | Lead Pb. |
| Cerium phosphate $CePO_4$ | Cerium Ce. |
| Potassium calcium phosphate $CaKPO_4$ | Thalium Tl. |
| Calcium phosphate $Ca_3(PO_4)_2+KCl$ | Thalium Tl. |
| Calcium sulfide CaS | Silver Ag. |
| Calcium oxyde CaO | Iron Fe, zinc Zn, gadolinium Gd. |
| Calcium or zinc silicate $Ca_2SiO_4$, $Zn_2SiO_4$ | Gadolinium Gd. |
| Baryum silicate $BaSiO_4$ | Lead Pb. |

Layer *c* (Figure 7–*e*) is constituted by a material emitting a luminescent visible light under the action of the ultra violet radiations produced by layer *s*, with a brightness reaching rapidly a maximum value when the number of ultra violet photons increases (that is to say when the intensity of the electron beam impinging on layer *s* increases) layer *c* is for example made of halide free ZnS (zinc sulfide) heated in an atmosphere of low HCl concentration and high $H_2S$ concentration. Under ultra violet radiations, a blue color is obtained (such as the one represented by point B on Figure 1–*c*) with an efficiency of about 5 lumens per watt. But many other substances sensitive to ultra violet radiations and giving a blue luminescence can be used for layer *c* provided that it is in very small particles (of only a few microns) well adsorbed against layer *s*.

Layer *b* (Figure 7–*e*) is constituted by a material emitting a luminescent visible light, unsensitive to the ultra violet radiations produced by layer *s*, not very sensitive to the blue light emitted by layer *c*, and moderately sensitive to cathode rays; use may be made of a zinc phosphate or of a zinc silicate for layer *b*, for example $(PO_4)_2Zn$ activated by manganese (Mn) which does not respond to radiations in the near ultra violet (3000 to 4000 angstroms) and which emits a red luminescent light (represented by point R on Figure 1–*c*) when electrons impinge on it, with an efficiency of about 8 lumens per watt.

Layer *a* (Figure 7–*e*) is constituted by a material also insensitive to ultra violet radiations, but very sensitive to cathode rays impinging on it, and producing then a bright luminescent light; layer *a* is for example made of zinc silicate $Zn_2SiO_4$ activated by manganese (Mn) emitting a luminescent light of green color (point V on Figure 1–*c*), with an efficiency of about 42 lumens per watt.

Therefore, for exciting layer *c*, an intense beam of electrons of relatively weak energy is needed: it will reach only layer *s*, through the thin metal film *m*; this corresponds to a high positive voltage applied to Wehnelt cylinder W of cathode ray tube O (Figure 7) and to a relatively small positive voltage applied to the post-accelerating electrode A of said tube O. For exciting layer *b*, a moderate beam of electrons of moderate energy is needed: it will penetrate through layer *s* and through layer *c*, and it will reach layer *b* (but not layer *a*); this corresponds to mean values of the voltages respectively applied to Wehnelt cylinder *w* and post-accelerating electrode A of tube O. For exciting layer *a*, a relatively weak beam of electrons of high energy is needed: it will go through layers *s*, *c* and *b*—and reach layer *a*. This corresponds to a relatively small positive potential applied to Wehnelt cylinder *w* and to a very high positive potential applied to A.

Finally it is necessary to have (outside tube O) a color filter Φ (Figure 3) absorbing the excess of fluorescent light emitted by layer *c* (when electrons reach layer *b*)— and also absorbing the excess light emitted by layer *b* (when electrons reach layer *a*).

Referring to Figure 1–*a*, there is a definite relation between band $B_3$ (of the same width as band $B'_2$) which determines the "definition" (that is, the total number of "elemental areas") of the coarse colored picture mentioned above on one side, and band $B_1$ (limited by the frequency $f_2$ of the color subcarrier), which determines the "definition" (that is, the total number of "points") of the detailed black and white picture mentioned above on the other side. Therefore it is obviously possible to derive (from the color subcarrier of frequency $f_2$ extraced by filter $F_4$ (Figure 7) (out of the received composite video signal V), by means of a classical frequency divider DM, a sine-wave of frequency $f_3$ corresponding to the number of "elemental areas" of the desired coarse colored picture of the televised object, which is the number of colored areas that the human eye can easily discriminate from each other on the surface of the televised object.

Figure 7–*b* (as well as Figure 7) shows this frequency divider DM of classical type; Figure 7–*a* represents, at the top, a sine wave 1 of frequency $f_3$ produced at the output of device DM; below this sine wave (1) is shown (on Figure 7–*a*) a sine wave (2) in opposite phase. If (1) is assumed to represent the potential applied to Wehnelt cylinder *w* of cathode ray tube O, and if (2) is assumed to represent (versus time) the potential applied simultaneously to post-accelerating electrode A of said tube O, then it is apparent that layer *c* will be excited during the periods marked *c* on Figure 7–*a* (a blue point being obtained on fluorescent screen *Fl*), while layer *b* will be excited during the periods marked *b* (a red point being obtained on fluorescent screen *Fl*), and while layer *a* will be excited during the periods marked *a* (a green point being obtained on fluorescent screen *Fl*)—these colored points being located at right places referred to the drawing of the televised object because the motions of the electron beams within cathode ray tubes O and O′ are perfectly synchronized, being produced by the same saw-tooth waves.

Figure 7–*b* (as well as Figure 7) shows two cathode ray tubes T*dc* (hue decoding tube) and T*ds* (saturation decoding tube). Tube T*dc* comprises: an ordinary cathode C of small area, two pairs of plates (V, H) for vertically and horizontally deflecting the electron beam emitted by said cathode C, a decoding electrode ED (represented also on Figure 7–*c*) provided with 3 slits (C, B, A), and a collecting electrode *ed*. Tube T*ds* comprises: a long rectilinear cathode C′ emitting a flat electron beam, a pair of plates H′ for horizontally deflecting said beam, a decoding electrode ED′ (represented on Figure 7–*d*) provided with a slit in form of a saw-tooth, an electron multiplier *ms* energized by the electrons passing through said slit and terminated by a collecting electrode *es*.

The corrected received chrominance signal *chr* (at the output of amplifier A*c*, Figure 7) is applied in parallel to deflecting plates H within tubes T*dc* and to deflecting plates H′ within tube T*ds*, while the sine wave (1) of frequency $f_3$, obtained at the output of DM, is simultaneously applied to deflecting plates V within tube T*dc*. Therefore, at a given instant, the electronic image of the cathode C of tube T*dc* scans a particular vertical line of decoding electrode ED corresponding to the dominant wavelength (or hue) of the chromaticity of the elemental area of the televised object being scanned at said instant in the transmitting station, whereas the rectilinear electron image of cathode C′ of tubes T*ds* is positioned on the particular vertical line of decoding electrode ED′ corresponding to the degree of saturation of the color of said scanned elemental area—because the abscissae on Figures 7–*c* and 7–*d* along the bases of decoding electrodes ED and ED′ are both the various values of the received corrected chrominance signal *chr* respectively equal to the numbers (0, 1 to 27) of the sectors of the color triangle (Figure 1–*c*). The sine wave of frequency $f_3$, produced by DM, reaches, through amplifier $A_1$ (having an odd number of amplification stages) the control grid of the gated amplifier $C_1$ (with gating grid $gc_1$); therefore an amplified wave (1) (Figure 7–*a*) is applied to Wehnelt cylinder *w* of cathode ray tube O; the sine wave of frequency $f_3$, produced by DM, reaches, through amplifier $A_2$ (having an even number of amplification stages) the control grid of the gated amplifier $C_2$ (with gating grid $gc_2$); therefore an amplified wave (2) (Figure 7–*a*) is applied to post accelerating electrode A of cathode ray tube O; simultaneously, the hue chrominance signal C collected by electrode *ed* of hue decoding tube T*dc* is applied in parallel to the gating grids ($gc_1$, $gc_2$) of amplifiers $C_1$, $C_2$ (see Figure 7–*v*).

Taking into account: (1) the electro-optical efficiencies of the fluorescent materials constituting the layers (*a, b, c*) of the stratified fluorescent screen *Fl* of tube O (42, 8 and 5 lumens per watt, for layers *a, b, c* respectively), (2) the variation of the size of the spots produced on said screen *Fl* when the intensity of the electron beam and the energy of the electrons of said beam vary under the control of the potentials applied to Wehnelt cylinder *w* and post accelerating electrode A, respectively energized by waves (1) and (2) (Figure 7–*a*), it is possible to determine, for the 3 slits (A, B, C) of decoding electrode ED of tube T*dc*, along each particular vertical line, such widths that the colored points successively obtained on screen *Fl* (during the scanning of said vertical line by the electron beam) produce together, on an elemental area of the projection screen EP, a color light which, mixed on said screen with the white light simultaneously projected by cathode ray tube O′ on said elemental area, gives the same impression of "chromaticity" than the corresponding elemental area of the televised object.

The determination of the widths of slits (A, B, C) of decoding electrode ED along a particular vertical line of abscissa *chr* (Figure 7–*c*) corresponding to chrominance signal *chr* in order that, the electron bundle passing successively through slits A, B, C produces, on fluorescent screen *Fl*, luminous fluxes of primary colors (blue, red, green) which together build up the "hue" represented by the corresponding sector in the color triangle (Figure 1–*c*) is a well known color mixture problem, very easily solved. The hue decoding electrode ED of tube T*dc* represented on Figure 7–*c* has been do deduced from the color triangle of Figure 1–*c*).

The amplified sine waves (1) and (2) are applied on Wehnelt cylinder *w* and post accelerating electrode A of tube O only when electrons are allowed to go through decoding electrode E*d* of hue decoding tube T*dc* and are collected by electrode *ed*, so producing the hue signal C which opens the gating grids $gc_1$, $gc_2$ of amplifiers $C_1$ and $C_2$. Therefore no regular pattern of colored dots is produced on screen *Fl*, whereas, for the viewing trichome tubes such as the shadow mask tube or the beam indexing apple tube having a fluorescent screen made of points (or strips) giving each always a luminescent light of primary color (blue, red or green), a permanent pattern (enlarged by projection) would be permanently visible.

For obtaining, on each elemental area of the combined picture appearing on projection screen EP (Figure 7) not only the correct "hue" of the color, but also the correct "degree of saturation," that is to say the correct ratio $$\left(\frac{\text{colored light}}{\text{white light}}\right)$$

use is made of pentode L acting as "luminance weighting device," as explained above, so that the amount of white light added by tube O′ to the colored light produced by tube O is great when saturation chrominance signal S is small, and vice versa. Figure 7–*d* (representing the saturation decoding electrode ED' of tube T*ds*, directly derived from Figure 1–*c*) shows that signal S is always proportional to the degree of saturation of the color represented by the sector corresponding to the corrected received chrominance signal of value *chr*, in color triangle of Figure 1–*c*.

Many modifications can be made to the arrangement shown on Figure 7 in accordance with the present invention and described above.

For example instead of the sine waves (1) and (2) shown on Figure 7–*a*, use may be made of waves in shape of isosceles triangles obtained by means of symmetrical multivibrators so that the scanning of hue decoding electrode ED within tube T*dc* is made with a constant and uniform velocity.

Also use can be made of other mapping schemes of Maxwell's color triangle than those shown on Figure 1–*c*. It was assumed hereabove that the encoding of the chrominance signal *chr* at the transmitting color television station was based on the mapping of Maxwell's color triangle as shown on Figure 1–*c*, and that the hue decoding tube T*dc* (Figure 7–*b*) produced a hue chrominance signal C corresponding successively to the primary components (blue, green, red) of the color of the elemental area of the televised object being scanned at the considered moment. But the present invention is not restricted to this particular encoding and decoding system, and can be applied to any other encoding and decoding method, used for the chrominance signal. Figure 7–*f* represents for example the circuitry of the decoding device to be used, in accordance with the invention, in case of the N.T.S.C. color television system of United States of America. DV represents again the video detector at the receiving station $F_4$ a filter taking out of the composite video signal V a wave of the frequency $f_2$ of the color subcarrier, and DM the device generating the sine-wave (1) (Figure 7–*a*) of frequency $f_3$ corresponding to the total number of elemental areas of the coarse colored picture to be projected on screen EP (Figure 7). DC is the classical decoding arrangement of N.T.S.C. system energized by the composite video signal V and providing, at its output terminals, the luminance signal $l$ (called Y in the N.T.S.C. system) and 3 voltages B, R, G corresponding to the primary components (blue, red and green) of the color of the scanned elemental area of the televised object. These voltages B, R, G go through electronic devices $\alpha$, $\beta$, $\gamma$—the output terminals of which are connected to 3 plates A, B, C within a cathode ray tube COM acting as electronic switch (or commutator) and comprising a cathode $c$ emitting electrons, a Wehnelt cylinder, an accelerating anode $a_1$ and a conductive inside coating acting as second anode $a_2$. These plates A, B, C replace, in this case, the slits A, B, C of decoding electrode ED of tube T*dc* of Figure 7–*b*. A magnetic coil $v$ energized by sine wave (1) of frequency $f_3$ produced by device DM deflects vertically the electron beam, which scans continuously the group of plates A, B, C up and down. Electronic devices, $\alpha$, $\beta$, $\gamma$ make normally negative these plates A, B, C; only when a primary signal (B, R or G) appears at the output of decoder DC, the corresponding plate (C, B or A) ceases to repel the electron beam. For example in case of a red hue, primary signal R makes, through device $\beta$, plate B positive, whereas plates A and C remain negative. Only when (deflected by coil $v$) the electron beam scans plate B, a current flows through resistor $\rho$, and therefore the gating grids $gc_1$ and $gc_2$ of amplifiers $C_1$ and $C_2$ are made positive, so that the appropriate voltages are conveyed to Wehnelt cylinder $w$ and post-accelerating electrode A of cathode ray tube O (Figure 7).

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and, therefore, such adaptations should, and are intended to be comprehended within the meaning and range of equivalence of the following claims.

What is claimed as new and desired to be secured by Letters Patent is:

1. A color television system comprising at the transmitting station: three cameras with photosensitive mosaics, means including dichroic mirrors selecting lights of different primary colors and an objective projecting on said mosaics, through said dichroic mirrors, three pictures of the scene to be shown at a distance and having respectively different primary colors whereby three primary signals are produced at the outputs of said three cameras for each scanned element of said scene; means including a matrix of resistors energized by said primary signals and producing three secondary signals X, Y and $$\frac{X+Y+Z}{3}$$

in accordance with the XYZ colorimetric reference system, and two pentodes energized by signals X and Y and biased by signal $$\frac{X+Y+Z}{3}$$

whereby two voltages $x$, $y$ proportional to the trichromatic coordinates of the color of said scanned element are produced; a hue encoding cathode ray tube having deflecting plates energized by said voltages $x$, $y$ and an anode in the shape of a color triangle mapped in sectors connected to different points of an output resistor for producing, at the terminal of said resistor, a "hue signal" corresponding to the hue of the color of said scanned element; means including a saturation encoding cathode ray tube having deflecting plates energized by said voltages $x$, $y$ and a fluorescent screen, a transparent screen in the form of a color triangle, and a photomultiplier illuminated by said fluorescent screen through said transparent screen, whereby a "saturation signal" proportional to the degree of saturation of the color of said scanned element is produced at the output of said photomultiplier; and means for transmitting to the distant receiving station said hue signal, said saturation signal and the luminance signal Y proportional to the brightness of said scanned element; and comprising at the receiving station; means for restoring said luminance signal, said hue signal and said saturation signal; means including a pentode energized by the low frequency part of said luminance signal and biased by said saturation signal for producing a "weighted luminance signal" in inverse proportion to the degree of saturation of the color of said scanned element, an electronic mixer mixing the output of said pentode with the medium and high frequency part of said luminance signal; and a viewing arrangement controlled by said hue signal and by the output of said electronic mixer for reproducing the colored picture of the scene being scanned at the transmitting station.

2. The color television system of claim 1, further comprising at the transmitting station: means including a local oscillator generating a color subcarrier, two gated amplifiers having control grids energized respectively by said hue signal and by said saturation signal and gating grids controlled by the lines synchronizing pulses, a modulator modulating the amplitude of said color subcarrier by the outputs of said gated amplifiers; during two successive scanning lines, and another electronic mixer mixing said modulated color subcarrier with said luminance signal; and comprising at the receiving station: means for restoring said hue and saturation signals, including two receiving gated amplifiers having their control grids energized by said modulated color subcarrier and their gating grids controlled by the received synchronizing signals, two detectors energized respectively by the outputs of said gated amplifiers, and a delay line for putting in the same time position said restored hue signal and saturation signal at the outputs of said detectors; means including a pentode energized by the low frequency part of the received luminance signal and biased by said restored saturation signal, and another matrix of resistors energized by the output of said pentode and by the medium and high frequency part of said luminance signal, for producing three signals proportional to the primary components of white light, at the output of said matrix; a hue decoding cathode ray tube having a Wehnelt cylinder energized by the low frequency part of said luminance signal, deflecting plates energized by said restored hue signal, a decoding electrode having three slits and three electron multipliers behind said slits, whereby three signals proportional to the primary components of the hue of the color of the scanned element are produced at the output of said tube; and a viewing arrangement including; three electronic mixers mixing the output signals of said matrix with the corresponding signals of said hue decoding tube, and a cathode ray tube having a trichrome fluorescent screen and three electron guns controlled by the outputs of said electronic mixers, whereby the colored picture of the scene being scanned at the transmitting station is reproduced on said trichrome fluorescent screen.

3. The color television system of claim 1, including a long distance wave-guide connecting the two corresponding stations, and further comprising at the transmitting station: encoding means including a local oscillator generating a color subcarrier, a modulator modulating the amplitude of the color subcarrier by said saturation signal, an electronic mixer energized by said luminance signal and by the output of said modulator, a sampling encoding device energized by the output of said mixer and producing a first group of coded pulses, another sampling encoding device energized by said hue signal for producing a second group of coded pulses, a timing circuit energized by said color subcarrier for timing the sampling and encoding operations, and a delay line for putting said second group of coded pulses in a time position immediately after said first group of coded pulses at the input of said wave-guide; and comprising at the receiving station at the output of said wave-guide: means including an electronic switch and a delay line for putting the received first and second groups of coded pulses in appropriate relative time positions; decoding means for restoring the luminance signal, the hue signal and the saturation signal, including sampling decoding devices energized, respectively, by said first and second groups of coded pulses, and a timing circuit energized by the received color subcarrier for timing the decoding operations in synchronism with the encoding fulfilled at the transmitting station; means including a pentode energized by the low frequency part of the received luminance signal and biased by said saturation signal, and another matrix of resistors energized by the output of said pentode and by the medium and high frequency part of said luminance signal, for producing at the output of said matrix three signals proportional to the primary components of white light; a hue decoding cathode ray tube having a Wehnelt cylinder energized by the low frequency part of said luminance signal, deflecting plates energized by said restored hue signal, a decoding electrode provided with three slits and three electron multipliers behind said slits, whereby three signals proportional to the primary components of the hue of the color of the scanned element are produced at the outputs of said tube and a viewing arrangement including three electronic mixers mixing the output signals of said matrix with the corresponding signals of said hue decoding tube, and a cathode ray tube having a trichrome fluorescent screen and three electron guns controlled by the outputs of said electronic mixers, whereby the colored image of the scene scanned at the transmitting station is reproduced on said trichrome fluorescent screen.

4. In the encoding means of the transmitting station in a system in accordance with claim 3: a device for producing an alternating pulse of predistorted shape as compared with a period of a regular sine wave, said device including two beam coders having vertically deflecting plates energized in parallel by the electric voltage to be pulse code modulated, horizontally deflecting plates energized in parallel by a saw-tooth wave generated by the timing circuit of said transmitting station, secondary electron collectors, quantizing electrodes, and encoding electrodes provided with horizontal lines of apertures having shapes adapted to produce, at final electrodes, respectively a positive pulse with gradual rise at the beginning and a negative pulse with gradual rise at the end; a delay line giving to said negative pulse a time position immediately after the corresponding positive pulse; and a further electronic mixer mixing together said positive pulse and said corresponding delayed negative pulse, and producing an alternating pulse with gradual rise at the beginning of the positive part and also at the end of the negative part to minimize the effect of the delay distortion of the line transmitting said alternating pulse.

5. In a system in accordance with claim 1, a receiving station for color television on a projection screen comprising: means for restoring said luminance signal, said hue signal and said saturation signal; means including a pentode energized by the low frequency part of the luminance signal, and biased by said saturation signal, to produce a "weighted luminance signal" in inverse proportion to the degree of saturation of the color of said scanned element, and an electronic mixer mixing the output of said pentode with the medium and high frequency part of said restored luminance signal; an electro-optical device including a cathode ray tube controlled by the output of said electronic mixer for producing, on said projection screen, a detailed black and white drawing of the scene being scanned at the transmitting station; means for generating a colored spot on said projection screen, including a powerful source of white light, a lens having its focus where said source is located, a polarizer, a first electro-optical color modulator having a birefringence controlled by said restored hue signal, and producing a first retardation corresponding to the hue of the color of said scanned element, an analyzer, a second electro-optical color modulator adapted to produce a second retardation equal to twice said first retardation, but only if said scanned element has a very saturated color, a second analyzer; and a lens concentrating the colored light emerging from said second analyzer; electrical means for controlling the birefringence of said second electro-optical color modulator, including a triode energized by said restored saturation signal and negatively biased by a local battery, so that its plate current is cut off except in case of a very saturated color of said scanned element, and a gated amplifier energized by said restored hue signal and having gating grid controlled by the output of said triode; and means for moving said colored spot upon the projection screen, including a mirror drum inserted in the path of the colored light emerging from said final lens, and an electric motor driving said mirror drum in synchronism with the generation of said detailed black and white drawing, whereby colored touches are superimposed, at the right places, ond said black and white drawing, to produce the colored picture of the scene being scanned at the distant transmitting station.

6. In a television system in accordance with claim 1, a receiving station for color television on a projection screen comprising: means for restoring said luminance signal, said hue signal and said saturation signal; means including a pentode energized by the low frequency part of the luminance signal, biased by said restored saturation signal and producing a "weighted luminance signal" in inverse proportion to the degree of saturation of the color of said scanned element, and an electronic mixer mixing the output of said pentode with the medium and high frequency part of said luminance signal; an electro-optical device including a cathode ray tube controlled by the output of said electronic mixer for producing, on said projection screen, a detailed black and white drawing of the scene being scanned at the transmitting station; means for generating a wave of frequency corresponding to the number of colored elements easily discriminable in the scene being scanned at the transmitting station, including filter separating the color subcarrier from the rest of the received signals, a frequency dividing device energized by said separated color subcarrier; a cathode ray tube having horizontally deflecting plates energized by said restored hue signal, vertically deflecting plates energized by said frequency dividing device, a decoding electrode having three slits of appropriate shapes and a final electrode collecting, behind said slits, successive "hue pulses" of the same intensity but of different durations corresponding to the primary components of the hue of the color of said scanned element; means for producing two waves of opposite phases including two gated amplifiers having their control grids energized by said frequency dividing device and having their gating grids controlled by said "hue pulses;" a cathode ray tube having a fluorescent screen adapted to produce lights of the different primary colors, its Wehnelt cylinder and its post accelerating electrode being respectively energized by said two waves of opposite phases, whereby points of the different primary colors are successively produced on said fluorescent screen in a predetermined order; optical means including a color filter for projecting on said projection screen colored touches corresponding to said colored points of said flurescent screen; and synchronizing means for locating said colored touches at the right places upon said detailed black and white drawing, whereby the colored picture of the scene being scanned at the distant transmission station is reproduced on said projection screen.

No references cited.